(12) United States Patent
Yamada et al.

(10) Patent No.: US 7,993,017 B2
(45) Date of Patent: Aug. 9, 2011

(54) PROJECTION DISPLAY APPARATUS

(75) Inventors: Akihiro Yamada, Tokyo (JP); Motoo Takahashi, Tokyo (JP); Akira Daijogo, Tokyo (JP); Tomohiro Bessho, Tokyo (JP); Kenji Samejima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 489 days.

(21) Appl. No.: 12/225,885

(22) PCT Filed: Oct. 29, 2007

(86) PCT No.: PCT/JP2007/070997
§ 371 (c)(1),
(2), (4) Date: Oct. 1, 2008

(87) PCT Pub. No.: WO2008/149477
PCT Pub. Date: Dec. 11, 2008

(65) Prior Publication Data
US 2010/0165296 A1    Jul. 1, 2010

(30) Foreign Application Priority Data
Jun. 8, 2007   (JP) ................................ 2007-152272

(51) Int. Cl.
*G03B 21/14* (2006.01)
(52) U.S. Cl. ............... 353/97; 353/84; 353/85; 353/86; 353/88; 353/89; 353/90; 353/91; 353/92; 353/93; 353/94; 353/98; 353/38; 359/233; 359/738; 359/739; 359/740; 359/234; 359/619; 359/620; 359/621; 359/622; 359/623; 348/751; 348/752; 348/753; 348/754; 348/755; 348/756; 348/757; 348/362; 348/E9.027; 362/330; 362/333; 362/336; 349/18; 349/57; 349/58; 349/96; 349/97; 349/7; 349/8; 349/9; 349/98; 349/99; 349/5; 349/6; 396/305; 396/308

(58) Field of Classification Search ................ 353/33, 353/22, 20, 84, 81, 30, 88, 97; 349/18, 57, 349/58, 96, 97, 98, 99, 5, 6, 7, 8, 9; 348/362, 348/E9.027, 751–757; 362/330, 333, 336; 359/233, 234, 236, 619, 620, 621, 622, 623, 359/624, 625, 626; 396/305, 308
See application file for complete search history.

(56) References Cited

U.S. PATENT DOCUMENTS
6,769,777 B1 * 8/2004 Dubin et al. .................... 353/97
(Continued)

FOREIGN PATENT DOCUMENTS
JP         61-121429 U        7/1986
(Continued)

*Primary Examiner* — Georgia Y Epps
*Assistant Examiner* — Sultan Chowdhury
(74) *Attorney, Agent, or Firm* — Birch, Stewart, Kolasch & Birch, LLP

(57) ABSTRACT

A projection display apparatus 101 in which the light quantity adjusting means has a simple and readily interchangeable structure, and which can improve image quality by adjusting the quantity of light received by a light valve continuously, without causing illuminance irregularities, and without having unwanted light radiated onto the screen, the light quantity adjusting means 9 having light blocking members 91L, 91R for blocking light in transit to a second lens array 22, and rotational axes 91LA, 91RA for turnably supporting each of the light blocking members on an xy plane, the light blocking members 91L, 91R and rotational axes 91LA, 91RA being positioned so that the rotational axes 91LA, 91RA are disposed in positions symmetric with respect to the optical axis AX on the xy plane, and the turning range from the light blocking initiation position at which the light blocking members 91L, 91R, by being turned, start to block light in transit toward the second lens array 22 to the maximum light blocking position at which the light blocking members 91L, 91R block a maximum quantity of the light in transit toward the second lens array 22 is equal to or less than ninety degrees.

27 Claims, 19 Drawing Sheets

U.S. PATENT DOCUMENTS

| | | |
|---|---|---|
| 6,877,865 B2 * | 4/2005 | English et al. .................. 353/97 |
| 2003/0086265 A1 | 5/2003 | Ilsaka et al. |
| 2004/0263697 A1 * | 12/2004 | Fuse et al. ......................... 349/5 |
| 2006/0077283 A1 | 4/2006 | Sasazaki et al. |
| 2007/0195288 A1 * | 8/2007 | Ahn ................................. 353/97 |

FOREIGN PATENT DOCUMENTS

| | | |
|---|---|---|
| JP | 2001-174910 A | 6/2001 |
| JP | 2003-241311 A | 8/2003 |
| JP | 2005-31103 A | 2/2005 |
| JP | 2006-133750 A | 5/2006 |
| WO | WO-03/032080 A1 | 4/2003 |
| WO | WO-2005/026835 A1 | 3/2005 |

* cited by examiner

FIG. 2
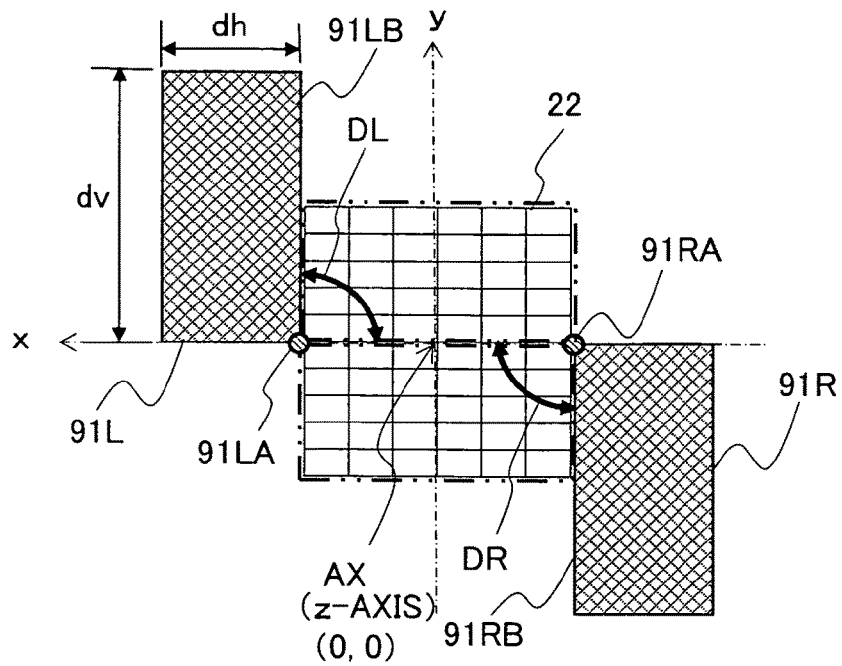
FIG. 3(a)    FIG. 3(b)
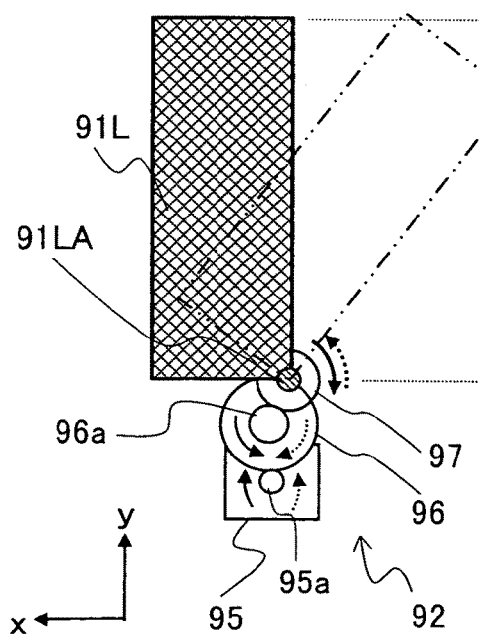    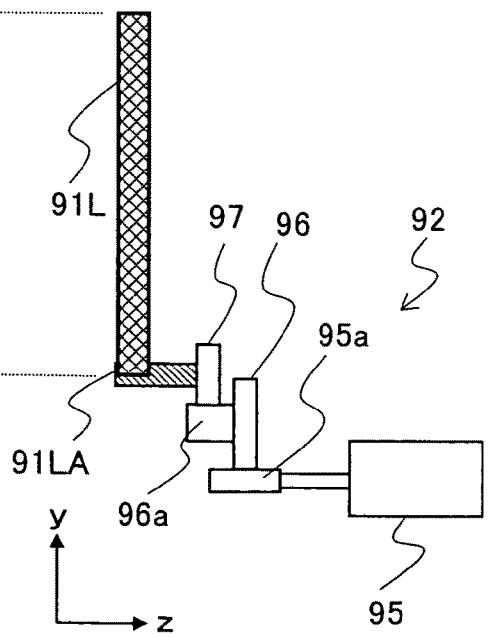

● : NON-PREFERRED POSITIONS OF ROTATIONAL AXES

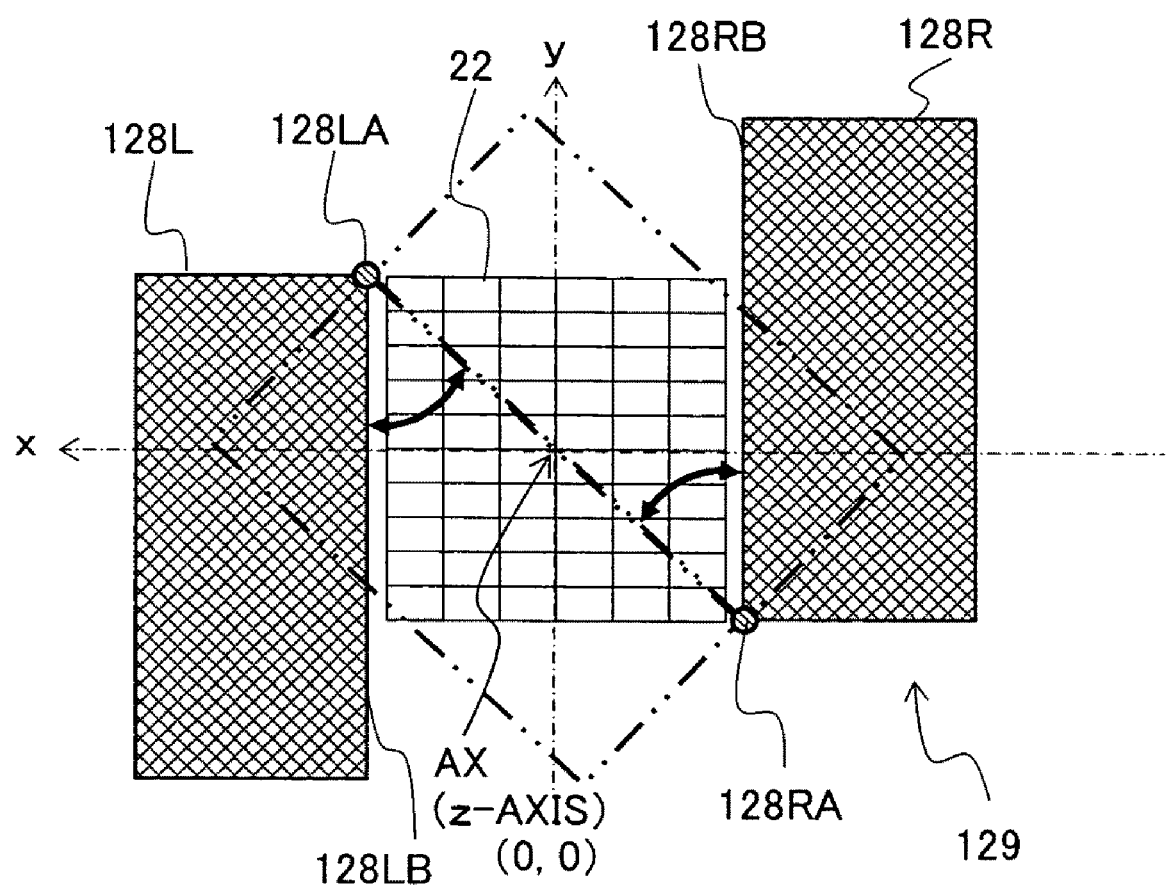

PROJECTION DISPLAY APPARATUS

TECHNICAL FIELD

The present invention relates to a projection display apparatus that adjusts the quantity of light incident on its light valve according to the video signal to be displayed.

BACKGROUND ART

High contrast tends to be difficult to obtain in projection display apparatus, because the light valve in the apparatus receives light that leaks from optical elements in the optical system, as well as stray light (unwanted light) generated by the optical elements, so that dark images are not displayed darkly enough. When images are projected onto a screen in a dark room, if dark images are not displayed darkly enough, the viewer experiences a particularly inadequate sense of contrast. A projection display apparatus has therefore been proposed that uses a first lens array and a second lens array to produce a uniform intensity of light and places a diaphragm mechanism between the first and second lens arrays to adjust the quantity of light incident on the light valve by sliding a diaphragm in a direction parallel to the second lens array or swinging a diaphragm around an axis orthogonal to the optical axis (see, for example, Patent Document 1).

Patent Document 1: WO2005/026835 (pp. 6 and 13, FIGS. 2A, 2B, 11B, and 12)

DISCLOSURE OF THE INVENTION

Problems to be Solved by the Invention

In the conventional projection display apparatus described above, to produce continuous changes in the illuminance on the light valve in response to the operation of the diaphragm (in other words, to eliminate regions in which the operation of the diaphragm does not produce any change in the illuminance), the leading edge of the diaphragm is formed with a serrated shape matching the shape of the convex lenses constituting the second lens array. A consequent problem is that the diaphragm (the light blocking body) for adjusting the quantity of light in the conventional projection display apparatus described above has a complex structure.

Another problem is that the mechanism for adjusting the quantity of light is not interchangeable, because a diaphragm mechanism in which the leading edge of the diaphragm is formed with a shape matching the shape of the convex lenses constituting the second lens array cannot be used without alteration for a projection display apparatus having a lens array with a different shape or size.

A further problem in the conventional projection display apparatus described above is that if the diaphragm were to be formed in a rectangular shape with a straight leading edge, then if the diaphragm were to be swung (around an axis orthogonal to the direction of the optical axis, in a direction such that the leading edge of the diaphragm approached the first lens array), when the leading edge of the diaphragm approached the first lens array and was positioned at the center of curvature of the convex lenses constituting the second lens array, an image of the straight edge of the diaphragm would be formed on the light valve, causing a line-like illuminance irregularity extending in the x-axis direction or y-axis direction on the light valve, degrading the quality of the displayed image. This problem will be described in more detail later with reference to FIGS. 10 to 14.

Moreover, in the conventional projection display apparatus described above, if the diaphragm is formed in a rectangular shape with a straight leading edge, then if the diaphragm is swung (around an axis orthogonal to the direction of the optical axis, in a direction such that the leading edge of the diaphragm approaches the second lens array), there may be cases in which unwanted light incident on the diaphragm is reflected toward the second lens array and reaches the screen, so it is possible that the screen may be illuminated by unwanted light. This problem will be described in more detail later with reference to FIG. 11.

The present invention addresses the above problems of the prior art with the object of providing a projection display apparatus that can improve image quality by using a light quantity adjusting means with a simple and easily interchangeable structure that can adjust the quantity of light received by the light valve continuously, without causing illuminance irregularities and without having the screen illuminated by unwanted light reflected by the light quantity adjusting means.

Means of Solution of the Problems

In an xyz coordinate system with a z-axis coincident with an optical axis, an x-axis orthogonal to the z-axis, and a y-axis orthogonal to the z-axis and the y-axis, the optical axis forming the origin of the xy plane, the projection display apparatus of the present invention has: a light source section for emitting light; a first lens array with convex lenses the shape of which, on a first plane orthogonal to the z-axis, is rectangular with long sides in the x-axis direction and short sides in the y-axis direction, arranged in an array with a plurality of rows and a plurality of columns on the first plane, for uniformizing an illuminance distribution of the light emitted from the light source section; a second lens array with convex lenses the shape of which, on a second plane orthogonal to the z-axis, is rectangular with long sides in the x-axis direction and short sides in the y-axis direction, arranged in an array with a plurality of rows and a plurality of columns on the second plane, disposed in a position, spaced apart from the first lens array, such that the individual convex lenses of the first lens array face the individual convex lenses of the second lens array, for uniformizing the illuminance distribution of the light transmitted through the first lens array; a light valve for receiving the light transmitted through the second lens array and outputting light modulated according to an image signal; a projection optical system for projecting the light output from the light valve onto a screen; and a light quantity adjusting means disposed between the first lens array and the second lens array for adjusting a quantity of the light received by the light valve; wherein the light quantity adjusting means comprises one pair or a plurality of pairs of light blocking members for blocking light in transit from the first lens array to the second lens array, one pair or a plurality of pairs of rotational axes for turnably supporting each of the light blocking members on the xy plane, a turning mechanism for turning the light blocking members, and a turning control unit for controlling operations of the turning mechanism; wherein, of the one pair or the plurality of pairs of light blocking members, the light blocking members constituting each pair have xy coordinates that are symmetric with respect to the origin; wherein, of the one pair or the plurality of pairs of rotational axes, the rotational axes constituting each pair have xy coordinates that are symmetric with respect to the origin; and wherein the light blocking members and the rotational axes are positioned so that when the light blocking members are turned in a direction that increases the quantity of light blocked by the light blocking members, the turning range from a light blocking initiation position of the light blocking members at which the light blocking members, by being turned, start to block light in transit toward the second lens array to a maximum light blocking position of the light blocking members at which the light blocking members block a maximum quantity of the light in transit toward the second lens array is equal to or less than ninety degrees, and the light blocking members and the rotational axes are positioned so that when the light blocking members are at the light blocking initiation position, at least part of each light blocking member is on the x-axis or the y-axis.

Effect of the Invention

Because of the adoption of a structure in which the light blocking members turn in an xy plane orthogonal to the optical axis in the present invention, the following effects are obtained: the turning mechanism of the light blocking members can be simplified; the shape of the leading edges of the light blocking members does not have to match the shape of the convex lenses in the second lens array 22, which simplifies the structure of the light blocking members in the light quantity adjusting means; and a light quantity adjusting means can be obtained that can be readily used in other apparatus.

Also because of the adoption of a structure in which the light blocking members turn in the xy plane, and because the turning range from the light blocking initiation position to the maximum light blocking position is equal to or less than ninety degrees, as they turn, the leading parts of the light blocking members do not align with the positions of joined edges of adjacent convex lenses in the second lens array, so the quantity of light received by the light valve can be made to vary continuously with respect to the turning angle of the light blocking members (so that there is no region in which the illuminance does not change even though the light blocking members are turning). Since the quantity of light received by the light valve can thus be adjusted continuously by the light quantity adjusting means, the effect is obtained that an image with an adequate sense of contrast can be displayed continuously.

BRIEF DESCRIPTION OF THE DRAWINGS

FIG. 2 is a front view (seen in the z-axis direction) schematically illustrating the structure and operation of the rotational light blocking section in embodiment 1.

FIGS. 3(a) and 3(b) are respectively a front view (seen in the z-axis direction) and a side view (seen in the x-axis direction) schematically illustrating the structure and operation of the turning mechanism in embodiment 1.

FIG. 31 is a front view (seen in the z-axis direction) schematically illustrating the structure and operation of the rotational light blocking section in a variation of embodiment 5.

Figure 1:
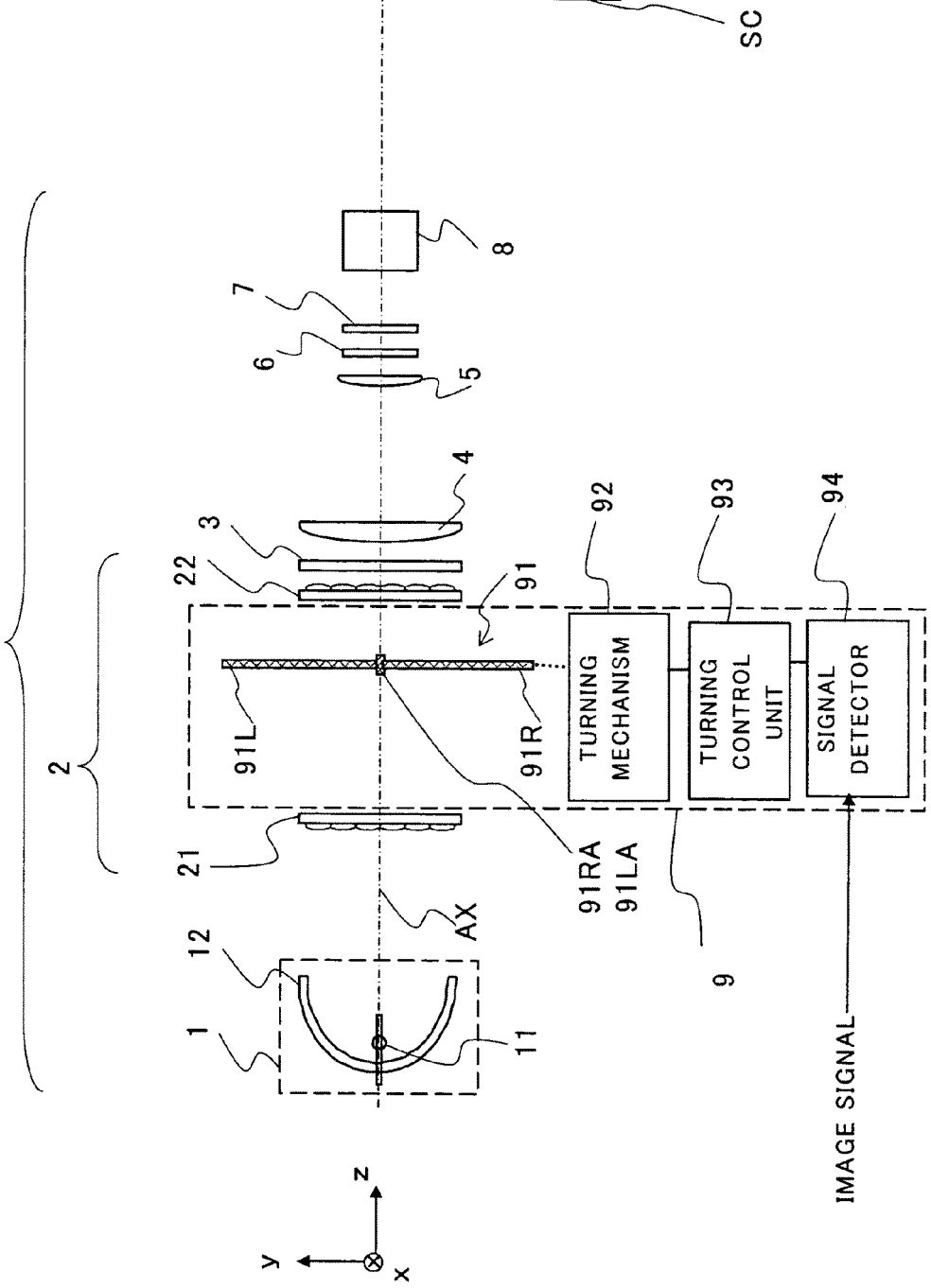
FIG. 1 is a drawing schematically illustrating the structure of the projection display apparatus according to embodiment 1 of the present invention.

DESCRIPTION OF REFERENCE NUMERALS 1 light source section, 2 integrator optical system, 3 polarization conversion element, 4 condenser lens, 5 field lens, 6 polarizer, 7 light valve, 8 projection optical system, 9, 126 light quantity adjusting means, 11 light source, 12 reflector, 21 first lens array, 22 second lens array, 31 polarization separation film, 32 reflective film, 33 λ/2 phase plate, 91, 121-126, 128, 129 rotational light blocking section, 91L, 91R, 91T, 91B, 91L2, 91R2, 128L, 128R light blocking member, 91LA, 91LB, 91RA, 91L2A, 91R2A, 91TA, 91BA, 128LA, 128RA rotational axis, 91LB, 91RB, 91L2B, 91R2B edges of the light blocking members that lead in the turning direction when turned in the direction that increases the quantity of light blocked, 92 turning mechanism, 93 turning control unit, 94 signal detector, 95 motor, 95a, 96, 96a, 97 gear, 101, 105 projection display apparatus, 201-204 dark regions between second light source images, AX optical axis, SC screen.

BEST MODE FOR CARRYING OUT THE INVENTION

Embodiment 1

Figure 4:
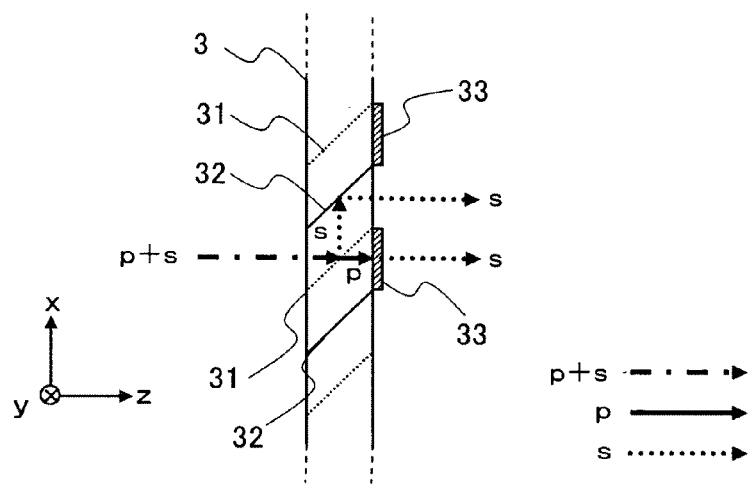
FIG. 4 is a drawing (seen in the y-axis direction) schematically illustrating the structure and operation of the polarization conversion element in embodiment 1.

FIG. 1 is a drawing schematically illustrating the structure of a projection display apparatus 101 according to embodiment 1 of the present invention. FIG. 2 is a front view (seen in the z-axis direction) schematically illustrating the structure and operation of the rotational light blocking section in embodiment 1; FIGS. 3(a) and 3(b) are respectively a front view (seen in the z-axis direction) and a side view (seen in the x-axis direction) schematically illustrating the structure and operation of the turning mechanism in embodiment 1. FIG. 4 is a partial enlarged view illustrating the structure of the polarization conversion element in embodiment 1. In the drawings, the z-axis denotes a coordinate axis coincident with the optical axis AX of the integrator optics 2 including the first lens array 21 and the second lens array 22, the x-axis denotes a horizontal coordinate axis orthogonal to the z-axis, and the y-axis denotes a vertical coordinate axis orthogonal to both the x-axis and the z-axis. The position of the optical axis (the z-axis position) is the origin (0, 0) in xy coordinates.

As shown in FIG. 1, the projection display apparatus 101 in embodiment 1 has a light source section 1, a first lens array 21 for uniformizing the illuminance distribution of the light emitted from the light source section 1, a second lens array 22 for uniformizing the illuminance distribution of the light transmitted through the first lens array 21, a polarization conversion element 3, a condenser lens 4, a field lens 5, a polarizer 6, a light valve 7 that receives light and outputs light modulated according to an image signal, a projection optical system 8 for projecting the light output from the light valve 7 onto a screen SC, and a light quantity adjusting means 9 for adjusting the quantity of light passing from the first lens array 21 to the second lens array 22. The first lens array 21 and the second lens array 22 constitute an integrator optical system 2 for uniformizing the illuminance distribution. Although only the structures related to the light path for one color are shown in FIG. 1, elements 1 to 7 and 9 may be provided for each of the colors red, green, and blue, and the image light of these colors may be combined by an optical combining element (not shown) before being projected onto the screen SC by the projection optical system 8.

As shown in FIG. 1, the light source section 1 comprises a light source 11 and a reflector 12 that reflects the light emitted from the light source 11 to the light valve 7. A high-pressure mercury lamp, a halogen lamp, or a xenon lamp is normally used as the light source 11. However, another type of light emitting device such as an LED device, a laser device, or an electrodeless discharge lamp may be used as the light source 11. The reflector 12 is a parabolic reflector or an elliptical reflector. The reflector 12 is not limited to this shape, however; a concave reflector with another shape may be used. The light source section 1 may have another shape or structure as long as it can concentrate the emitted light onto the polarization conversion element 3. A parabolic reflector 12 may be used when, for example, the light emitted from the light source section 1 onto the integrator optical system 2 is Pcollimated to a flux substantially parallel to the optical axis AX. Alternatively, the light received at the integrator optical system 2 may be collimated to a flux substantially parallel to the optical axis AX by using an elliptical reflector 12 and placing a concave lens (not shown) between the light source section 1 and the integrator optical system 2.

The first lens array 21 and the second lens array 22 of the integrator optical system 2 comprise a plurality of convex lenses (also referred as lens cells or cells) which have rectangular shapes with their long sides oriented in the x-axis direction and their short sides oriented in the y-axis direction, arranged in an array (matrix) with a plurality of rows and columns. The individual convex lenses of the first lens array 21 face the respective convex lenses of the second lens array 22 in the z-axis direction. The lenses of the first lens array 21 and the second lens array 22 have the same shape.

The polarization conversion element 3 is a device that and converts the received light flux to one type of linearly polarized light and outputs the polarized light. As shown in FIG. 4, the polarization conversion element 3 comprises a from each other in the x-axis direction and slanted with respect to the z-axis (for example, at an angle of 45 degrees), reflective films 32 slanted with respect to the z-axis (for example at an angle of 45 degrees) between the adjacent polarization separation films 31, and λ/2 phase plates 33 disposed on the light valve 7 sides (the right side in FIG. 4) of the polarization separation films 31. The light received at the polarization conversion element 3 (for example light (p+s) comprising p-polarized light and s-polarized light) is separated into p-polarized light and s-polarized light by the polarization separation films 31. The p-polarized light separated by the polarization separation films 31 is transmitted through the polarization separation films 31, impinges on the λ/2 phase plates 33, is converted to s-polarized light by the λ/2 phase plates 33, and is output therefrom. The s-polarized light separated by the polarization separation films 31 is reflected from the reflective films 32 and output. Thus, almost all the (p+s) light incident on the polarization conversion element 3 is converted to and output as s-polarized light.

The light valve 7 is, for example, a transmissive liquid crystal light valve. Alternatively, the light valve 7 may be another type of light valve such as a reflective liquid crystal light valve.

The light quantity adjusting means 9 has a pair of light blocking members 91L, 91R for blocking light in transit from the first lens array 21 to the second lens array 22, a pair of rotational axes 91LA, 91RA for turnably supporting each of the light blocking members 91L, 91R on an xy plane orthogonal to the z-axis, a turning mechanism 92 for turning the light blocking members 91L, 91R, a turning control unit 93 for controlling the operation of the turning mechanism 92, and a signal detector 94 that detects the image signal input to the light valve 7 and calculates a relative quantity of light from the detection result. The pair of light blocking members 91L, 91R and the pair of rotational axes 91LA, 91RA constitute the rotational light blocking section 91. The turning control unit 93 controls the turning of the rotational light blocking section 91 according to a relative value of the luminance of the image signal calculated by the signal detector 94. Specifically, the turning control unit 93 controls the operation of the turning mechanism 92 so as to increase the quantity of light blocked by the light blocking members 91L, 91R (thereby reducing the quantity of light received by the light valve 7) as the calculated relative value of the luminance of the image signal decreases, and reduce the quantity of light blocked by the light blocking members 91L, 91R (thereby increasing the quantity of light received by the light valve 7) as the calculated relative value of the luminance of the image signal increases.

The light blocking members 91L, 91R, rotational axes 91LA, 91RA, and second lens array 22 are shown in FIG. 2 as seen from the z-axis direction. As shown in FIG. 2, the pair of light blocking members 91L, 91R and the pair of rotational axes 91LA, 91RA are disposed in symmetric positions with respect to the optical axis AX, that is, the origin (0, 0) on the xy plane. Moreover, the light blocking members 91L, 91R and the rotational axes 91LA, 91RA are positioned so that when they are turned in the direction that increases the quantity of light blocked by the light blocking members 91L, 91R (in FIG. 2, the direction that increases the quantity of light blocked is the clockwise direction for light blocking member 91L, and is also the clockwise direction for light blocking member 91R), the turning range from the light blocking initiation position of the light blocking members 91L, 91R at which the light blocking members 91L, 91R, by being turned, start to block light in transit toward the second lens array 22 (the position of the light blocking members 91L, 91R indicated by solid lines in FIG. 2, also referred to as the 'minimum completely open position') to the maximum light blocking position of the light blocking members 91L, 91R at which the light blocking members 91L, 91R block a maximum quantity of the light in transit toward the second lens array 22 (the position of the light blocking members an, 91R indicated by phantom lines in FIG. 16, also referred to as the 'maximum light blocking position') is equal to ninety degrees.

In the xy coordinate system, the rotational axis 91LA of light blocking member 91L is disposed in the positive part of the x-axis (on the left side of the optical axis AX in FIG. 2), and the rotational axis 91RA of light blocking member 91R is disposed in the negative part of the x-axis (on the right side of the optical axis AX in FIG. 2). As shown in FIG. 2, light blocking member 91L is installed so that it can turn in the xy plane in the direction of arrow DL, with rotational axis 91LA as the center of rotation. Light blocking member 91R is installed so that it can turn in the xy plane in the direction of arrow DR, with rotational axis 91RA as the center of rotation. The rotational light blocking section 91 is rotatably driven by the turning mechanism 92 in response to control signals from the turning control unit 93 so as to turn toward the optical axis AX from both sides of the light path (thereby intruding into the light path) or to turn so as to withdraw from the light path from both sides, as shown in FIG. 2, and adjusts the quantity of light (received by the light valve 7) according to the amount by which it intrudes into the light path. The edges 91LB, 91RB of the light blocking members 91L, 91R that lead in the turning direction when the light blocking members 91L, 91R are turned in the direction that increases the quantity of light blocked by the light blocking members 91L, 91R have a straight shape.

As shown in FIG. 3(a) and FIG. 3(b), the turning mechanism 92 is a mechanism for turning the light blocking member 91L, comprising a motor 95, a gear 95a attached to the shaft of the motor 95, a gear 96 that engages gear 95a, a gear 96a coaxially fixed to gear 96, and a gear 97 that engages gear 96a and is fixed to the rotational axis 91LA. The mechanism for turning the light blocking member 91R has a similar structure. When the motor 95 operates to turn gear 95a in the direction indicated by the solid line (the clockwise direction in FIG. 3(a)), gear 96 and gear 96a turn in the direction indicated by the solid line (the counter-clockwise direction in FIG. 3(a)), and gear 97, the rotational axis 91LA, and light blocking member 91L turn in the direction indicated by the solid line (the clockwise direction in FIG. 3(a)). When the motor 95 operates to turn gear 95a in the direction indicated by the dotted line (the counter-clockwise direction in FIG. 3(a)), gear 96 and gear 96a turn in the direction indicated by the dotted line (the clockwise direction in FIG. 3(a)), and gear 97, the rotational axis 91LA and the light blocking member 91L turn in the direction indicated by the dotted line (the counter-clockwise direction in FIG. 3(a)). The structure of the rotational light blocking section 91 is not limited to the example shown in the drawing; other structures may be used instead.

In order to obtain high contrast, the light quantity adjusting means 9 does not block the light in transit toward the second lens array 22 when an image having an image signal with high luminance is displayed, but it blocks the light in transit toward the second lens array 22 according to the level of the image signal when it displays an image having an image signal with low luminance. Specifically, for a bright image signal having a relative luminance of 100%, the light quantity adjusting means 9 does not block the light in transit toward the second lens array 22 (0% blocking) and lets 100% of the light reach the light valve 7. For a dark image signal having a relative luminance of 20%, the light quantity adjusting means 9 blocks 80% of the light in transit toward the second lens array 22 and lets 20% of the light reach the light valve 7. By adjustment of the percentage of light as above, the brightness of the displayed image can be scaled by a factor of about five. For an image signal having a relative luminance of 0%, the light quantity adjusting means 9 blocks 100% of the light in transit toward the second lens array 22 and lets 20% of the light reach the light valve 7. By this operation, for a dark image signal having a relative luminance value of 0%, the light quantity adjusting means 9 blocks 100% of the light in transit toward the second lens array 22, so an adequately dark image can be displayed. Images with improved contrast can be obtained by this type of control. In other words, since the transmittance of the light valve 7 is substantially constant, the brightness of an image can be adjusted by adjusting the quantity of light received by the light valve 7. The relationship between the relative luminance of the image signal and the percentage of light received by the light valve 7 is not limited to the above relationship; other relationships are also possible as long as the percentage of light increases as the relative luminance of the image signal increases.

Figure 5A:
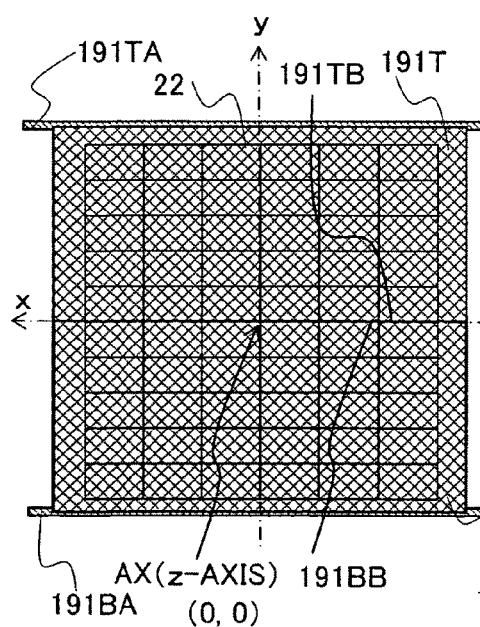
FIGS. 5(a) and 5(b) are respectively a front view (seen in the z-axis direction) and a side view (seen in the x-axis direction) schematically illustrating the structure and operation of the rotational light blocking section in a comparative example.
Figure 5B:
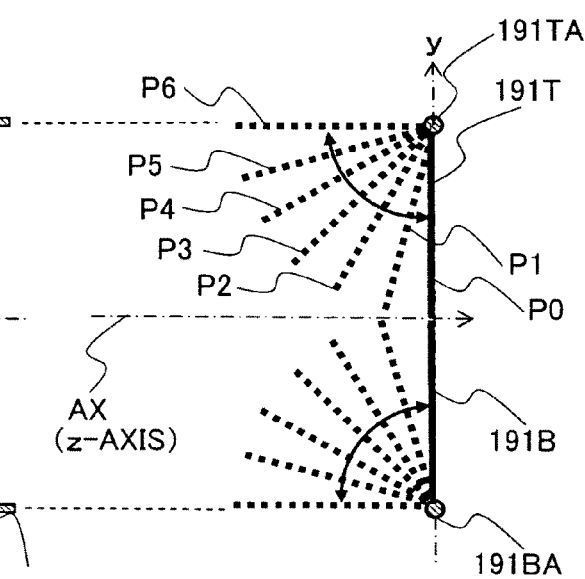

FIGS. 5(*a*) and 5(*b*) are respectively a front view (seen in the z-axis direction) and a side view (seen in the x-axis direction) schematically illustrating the structure and operation of the rotational light blocking section in comparative example C1. FIG. 5(*a*) shows the light blocking members 191T, 191B, rotational axes 191TA, 191BA, and second lens array 22 seen in the z-axis direction. FIG. 5(*b*) shows the light blocking members 191T, 191B and rotational axes 191TA, 191BA seen in the x-axis direction. The projection display apparatus in comparative example C1 differs from the projection display apparatus 101 according to embodiment 1, only the structure of the rotational light blocking section of which is shown in FIG. 1. The rotational light blocking section in comparative example C1 comprises rotational axes 191TA, 191BA oriented in the x-axis direction and rectangular light blocking members 191T, 191B respectively supported by the rotational axes 191TA, 191BA. The light blocking members 191T, 191B are turned around the rotational axes 191TA, 191BA as shown in FIG. 5(*b*). The leading edges 191TB, 191BB of the light blocking members 191T and 191B have a straight shape. FIG. 5(*b*) illustrates the movement of the light blocking members 191T, 191B when they are turned around the rotational axes 191TA, 191BA in turning angle steps of fifteen degrees (positions P0 to P6).

Figure 6:
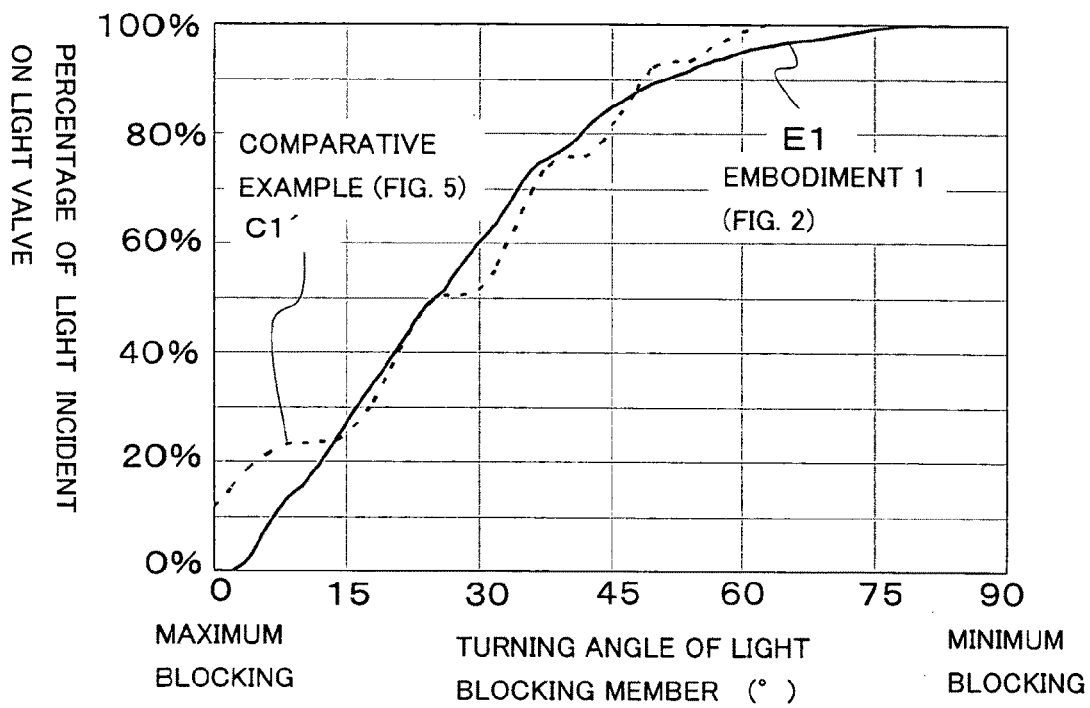
FIG. 6 is a drawing illustrating the result of a simulation of the relationship between the turning angle of the light blocking members and the percentage of light incident on the light valve in the projection display apparatus according to embodiment 1.

FIG. 6 is a drawing illustrating the result of a simulation of variations in the relative percentage of light with respect to the turning angle for embodiment 1 shown in FIG. 2 (curve E1) and the comparative example shown in FIG. 5 (curve C1'). FIG. 6 shows the results of a simulation in which the turning angle was varied in steps of two degrees. The vertical axis in FIG. 6 represents the percentage of light received by the light valve 7. The horizontal axis in FIG. 6 represents the turning angle of the light blocking members 91L, 91R in embodiment 1 in FIG. 2 (E1) and of the light blocking members 191T, 191B in comparative embodiment C1 in FIG. 5. The turning angle is zero degrees at the position where the light blocking members are completely closed (the maximum quantity of light is blocked). The quantity of light blocked decreases as the turning angle increases. In order to clearly compare the curves E1 of embodiment 1 and C1' of the comparative example, the result of the simulation (curve C1 shown in FIG. 7, described below) is shifted toward the left in FIG. 6. The curve C1' (dotted line) of the comparative example in FIG. 6 has four flat parts where the percentage of light does not vary linearly, that is, there are flat parts where the percentage of light does not vary with the turning of the light blocking members, so the percentage of light does not vary continuously. The curve (solid line) of embodiment 1 (E1), however, has no flat parts, so the percentage of light varies continuously in response to the turning of the light blocking members. Therefore, the percentage of light can be continuously adjusted even when the edges of light blocking members 91L, 91R that lead in the turning direction when the light blocking members 91L, 91R are turned in the direction that increases the quantity of the light blocked by the light blocking members 91L, 91R have a straight shape instead of a stepped shape.

Figure 7:
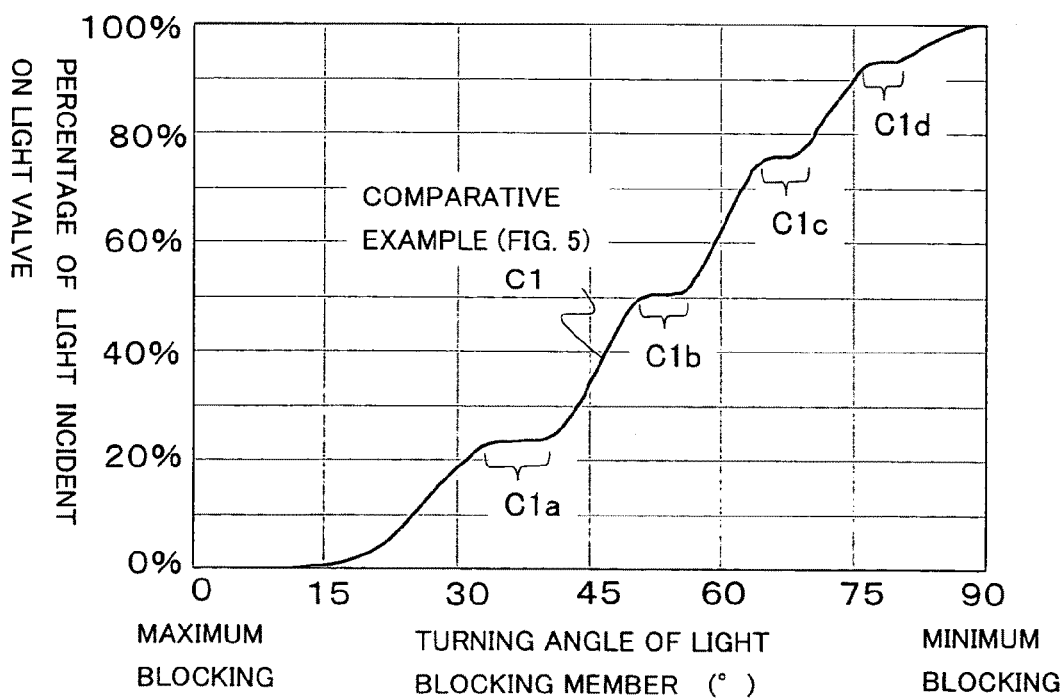
FIG. 7 is a drawing illustrating the result of a simulation of the relationship between the turning angle of the light blocking members and the percentage of light incident on the light valve in the projection display apparatus of the comparative example.

FIG. 7 is a drawing illustrating the result of a simulation of variations in the relative percentage of light with respect to the turning angle for the comparative example in FIG. 5. FIG. 7 shows the curve C1 before it was shifted to curve C1' in FIG. 6. The vertical axis in FIG. 7 represents the percentage of light received by the light valve 7, while the horizontal axis represents the turning angle of the light blocking members 191T, 191B in the comparative example in FIG. 5. The turning angle is zero degrees at a position where the light blocking members 191T, 191B are completely closed (the maximum light blocking position), and the quantity of the light blocked decreases as the turning angle increases. For the comparative example in FIG. 5, the curve has four flat parts C1*a*, C1*b*, C1*c*, C1*d* where the percentage of light does not vary even though the light blocking members 191T, 191B are being turned; the percentage of light cannot be adjusted continuously in these parts C1*a*, C1*b*, C1*c*, C1*d*.

Figure 8:
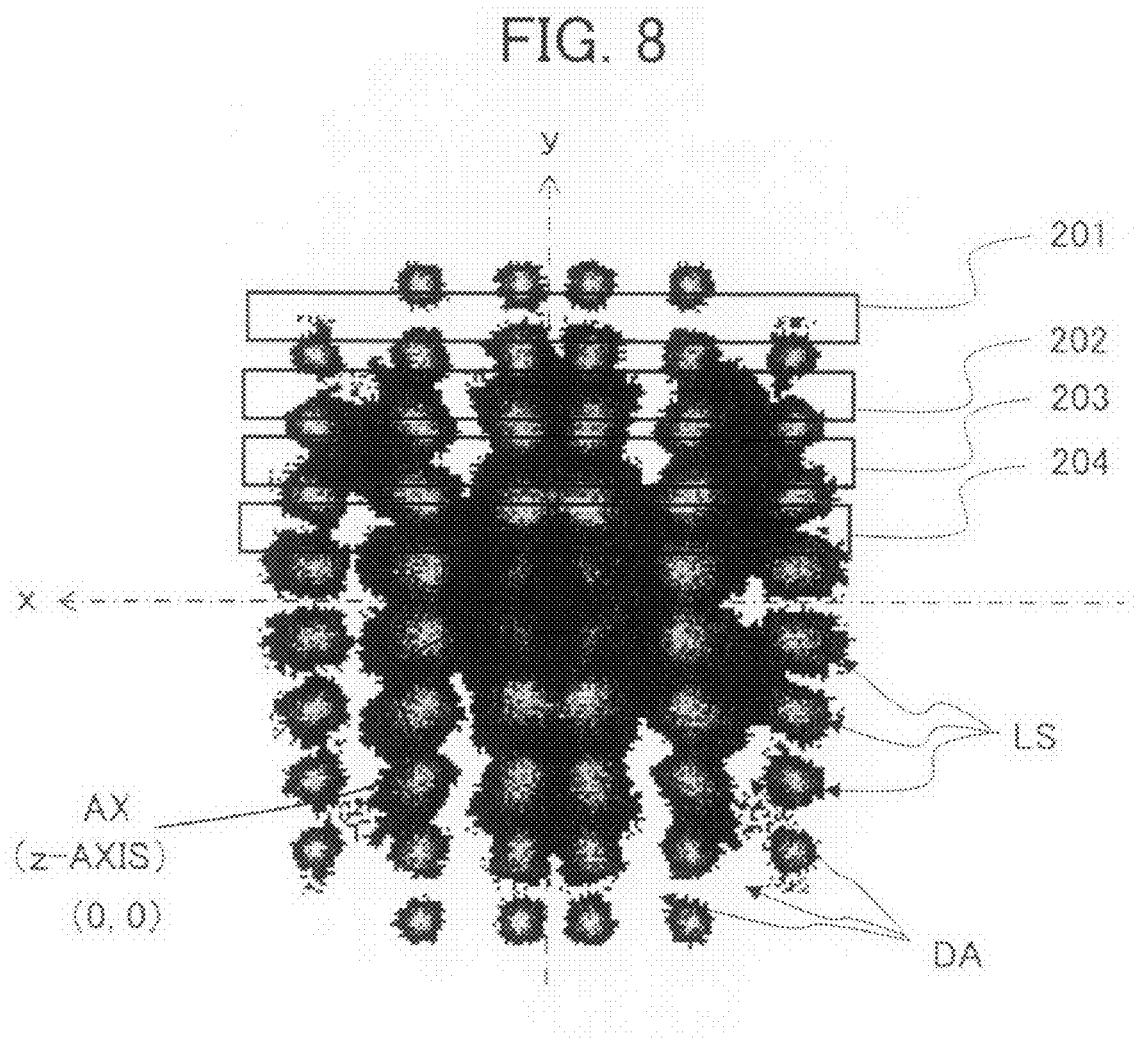
FIG. 8 is a drawing illustrating dark regions between images of the second light source near the second lens array in embodiment 1.

FIG. 8 is a drawing showing an example of a second light source image near the second lens array 22, represented on a gray scale with 256 gray levels. The plurality of nearly black regions LS with substantially circular or elliptical shapes in FIG. 8 represent light source images through which the light from the light source section 1 is transmitted (bright regions onto which the light is focused). The numerous white spaces DA between the plurality of light source images LS represent regions through which little light from the light source section 1 passes (dark regions through which light does not pass). Inside the light source images LS in FIG. 8, however, luminance is represented on a gray scale with 256 gray levels in which the nearly white areas are high brightness areas that receive much light from the light source section 1, while dark black areas are low brightness areas that receive less light from the light source section 1, the reverse of the situation outside the light source images LS. In FIG. 8, regions 201, 202, 203, and 204 are regions between the light source images in the positive y-axis area (the area above optical axis AX in FIG. 8); these regions 201, 202, 203, 204 are dark. The flat parts C1*a*, C1*b*, C1*c*, C1*d* in the curve C1 for the comparative example in FIG. 7 correspond to the dark regions 204, 203, 202, 201 between the light source images in the positive y-axis area in FIG. 8. The flat parts C1*a*, C1*b*, C1*c* and C1*d* in the comparative example in FIG. 7 can be considered to be the effect of the regions 204, 203, 202, 201 between the light source images in the positive y-axis region in FIG. 8. The flat parts C1*a*, C1*b*, C1*c* and C1*d* in FIG. 7 correspond to regions 204, 203, 202, 201, respectively, in FIG. 8. As shown in FIG. 8, the regions 201, 202, 203, 204 between the light source images spread in a direction parallel to the x-axis, so if the leading edges of the light blocking members 191T, 191B have straight shapes parallel to the x-axis and the light blocking members 191T, 191B are turned with their leading edge parallel to the x-axis, as in the comparative example in FIG. 5, flat parts will appear in the curve representing change in percentage of light, as shown in FIG. 7. In embodiment 1 shown in FIG. 2, however, even if the light blocking members 91L, 91R have straight edges 91LB, 91RB that lead in the turning direction, because the opening and closing operation takes place in the xy plane with the edges 91LB, 91RB that lead in the turning direction slanted with respect to the x-axis, light is blocked, simultaneously in the bright areas (the nearly white areas inside the light source images LS in FIG. 8) and dark areas (the nearly black areas inside the light source images LS in FIG. 8 and the white areas outside the light source images LS in FIG. 8), so it becomes possible to decrease the quantity of light continuously. In other words, when the light blocking members are moved parallel to the x-axis or y-axis, the percentage of light does not vary continuously unless special measures are taken, such as giving the light blocking members step-shaped leading edges as in the prior art, but in the projection display apparatus 101 in embodiment 1, the percentage of light can be varied continuously even if the light blocking members 91L, 91R have straight leading edges 91LB, 91RB. As can be seen in FIG. 8, there are also dark regions parallel to the y-axis (running in the vertical direction in FIG. 8) between the light source images, so the percentage of light can also be varied continuously when a pair of the light blocking members are provided on the positive and negative sides of the second lens array 22 in the y-axis direction (embodiment 3, described below).

Figure 9:
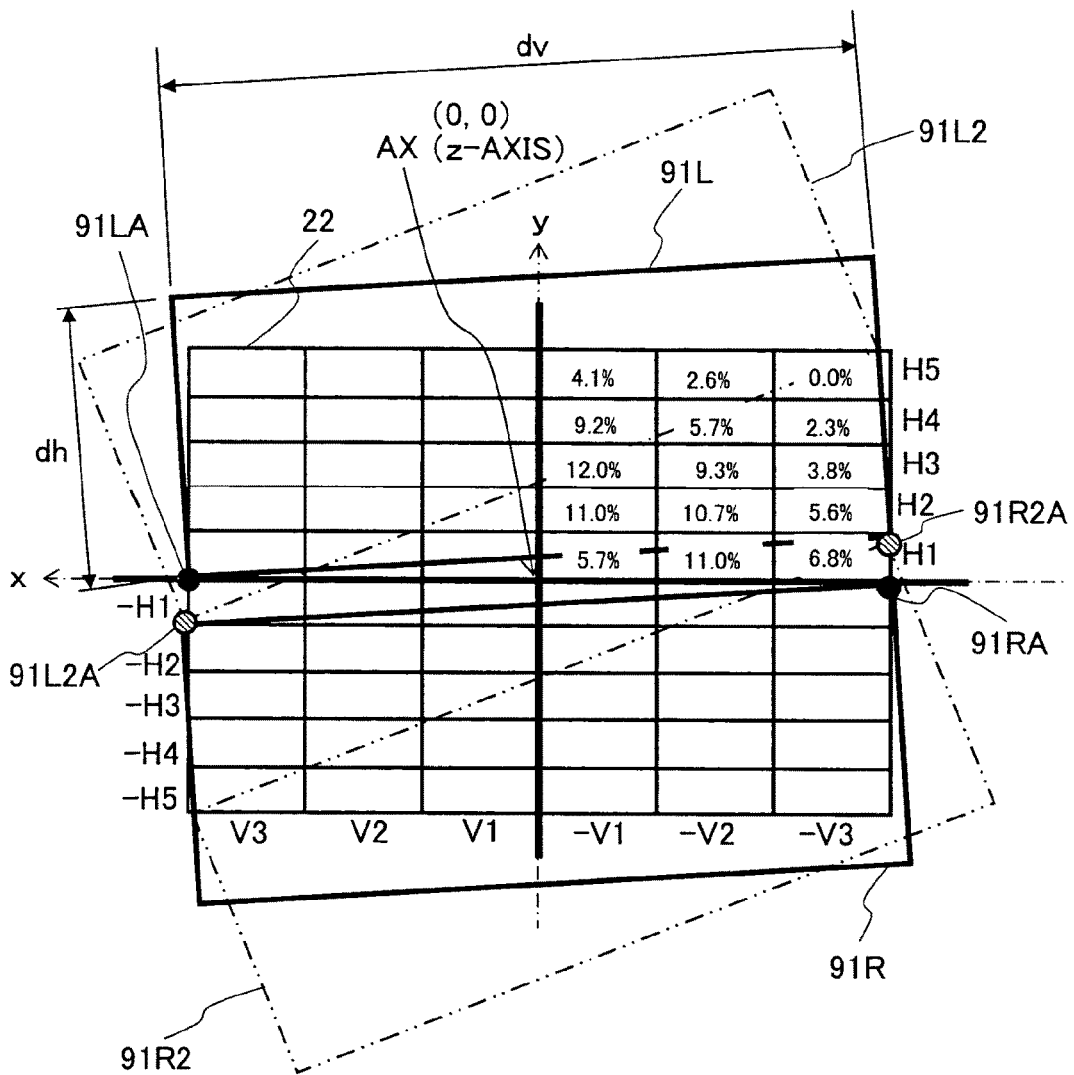
FIG. 9 is a drawing illustrating the effect of the projection display apparatus according to embodiment 1.

FIG. 9 is a drawing showing results calculated by simulation of the quantity of light transmitted through each cell (convex lens) in the second lens array 22, shown by numerical values in the cells. Since the second lens array 22 is symmetric with respect to the x-axis (vertically symmetric in FIG. 9) and the y-axis (horizontally symmetric in FIG. 9), only the simulation results in the first quadrant in the xy-plane with the optical axis AX at the origin are shown. The simulation results are shown with the whole first quadrant normalized to 100%. Notations such as {+H1, +V2}, for example, are used to distinguish the cells. For example, {+H1, +V1} indicates the cell in position H1 in the y-axis direction and position V1 in the x-axis direction. {−H1, −V1} represents'a cell in position −H1 in the y-axis direction and position −V1 in the x-axis direction. As can be seen in FIG. 9, much light is emitted from cells {±H1, ±V2}, {±H2, ±V1}, {±H2, ±V2} and {±H3, ±V1}. As seen in FIGS. 8 and 9, cells {±H1, ±V2}, {±H2, ±V1}, {±H2, ±V2} and {±H3, ±V1} are not only cells from which much light is emitted; they can also be regarded as regions in which the difference in the quantity of light between bright areas (the nearly white areas inside the light source images LS in FIG. 8) and dark areas (the nearly black regions inside the light source images LS and the white regions outside the light source images LS in FIG. 8: for example, regions 204 and 203) is especially large. Therefore, when the straight leading edges of the light blocking members pass through these regions having large differences in quantities of light, it is highly desirable for them to pass through with their leading edges slanted with respect to the x-axis (or to regions 204 and 203 in FIG. 8). A more continuous adjustment of the quantity of light may therefore be possible if the positions of the light blocking members 91L, 91R in FIG. 9 and their rotational axes are shifted (as shown by the phantom lines) to 91L2A and 91R2A, for example, so that light blocking member 91L can pass through the cells {±H1, ±V2}, {±H2, V1}, {±H2, ±V2} and {±H3, ±V1} having high percentages of light with its leading edge slanted with respect to the x-axis. The positions of the light blocking members indicated by phantom lines will be described in embodiment 2.

From FIG. 9, when the light blocking members 91L, 91R have the same size, the length dh of their short sides preferably satisfies the following equation 1, while the length dv of their long sides preferably satisfies the following equation 2. In these equations, the lengths in the y-axis direction of the cells are represented by H1, H2, H3, H4, and H5, while the lengths in the x-axis direction are represented by V1, V2, and V3.

$$dh \geq H1+H2+H3+H4+H5 \qquad (1)$$

$$dv \geq \{(H1+H2+H3+H4+H5)^2+(V1+V2+V3)^2\}^{0.5} \qquad (2)$$

Figure 10:
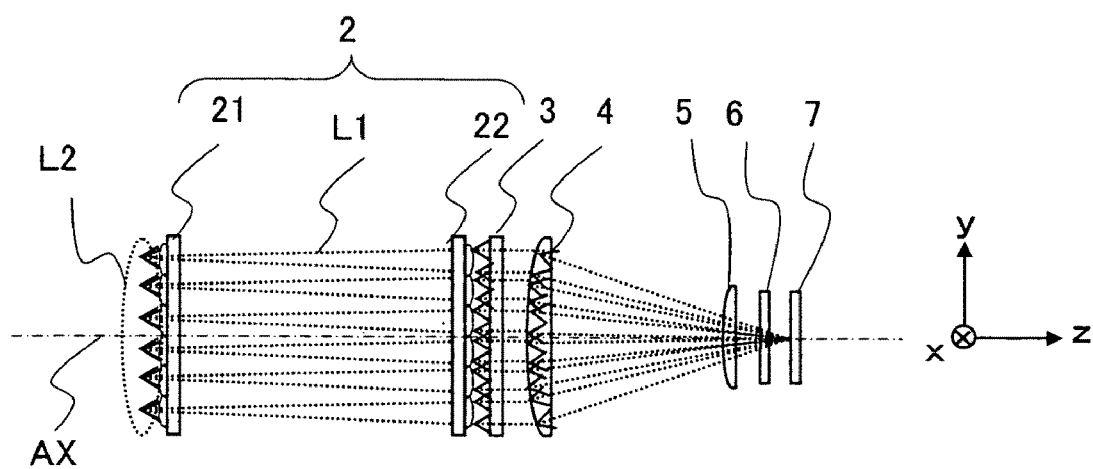
FIG. 10 is a ray trace diagram showing that the center position of the light valve is conjugate to a position near the first lens array.

FIG. 10 schematically shows ray traces traced backward from the center of the light valve 7. L1 denotes the traces of light rays. L2 denotes the area onto which the light L1 is focused. As shown in FIG. 10, a region near the first lens array 21 is focused to an image on the light valve 7. That is, the light valve 7 is conjugate to a region near the incident surface of the first lens array 21. Therefore, when the leading edges of the light blocking members are near the focal position of the second lens array 22 (in the comparative example in FIG. 5), images of the leading edges of the light blocking members 191T, 191B are formed on the light valve 7, causing a line-like illuminance irregularity extending in the x-axis direction near the center in the y-axis direction of the light valve 7. When the light blocking members 91L, 91R turn in the xy plane, and are disposed near the second lens array 22 as in the present invention, the above problem can be prevented.

Figure 12:
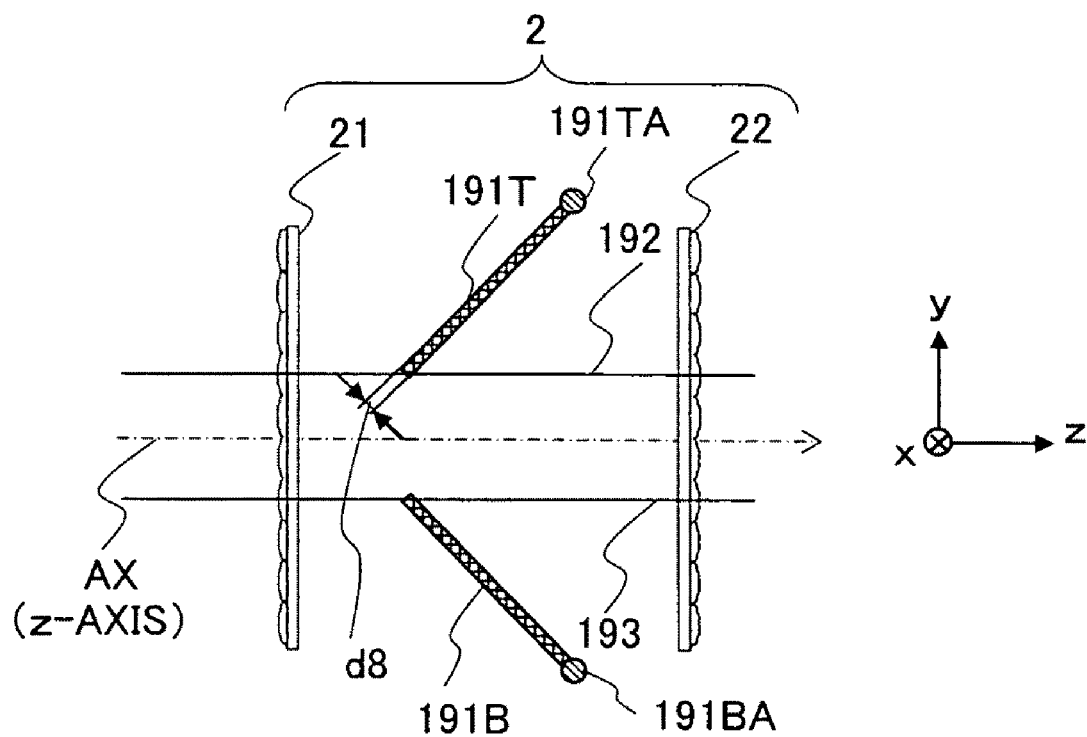
FIG. 12 is a side view (seen in the x-axis direction) schematically illustrating the light blocking members and their rotational axes in the comparative example.
Figure 13:
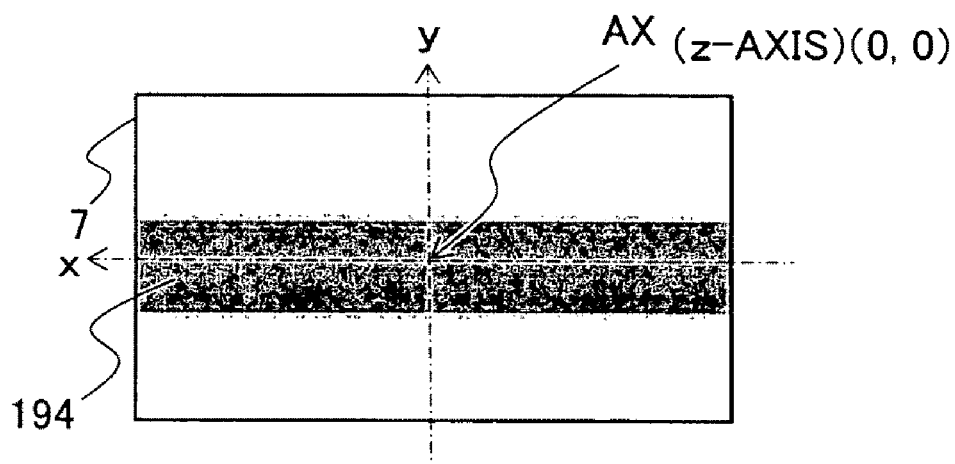
FIG. 13 is a front view schematically illustrating the unevenness of illuminance on the light valve of the projection display apparatus in the comparative example.
Figure 14:
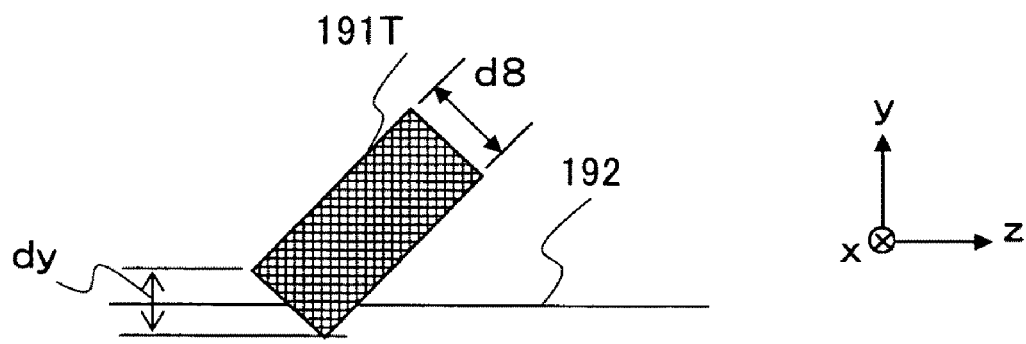
FIG. 14 is an enlarged view of the main part of FIG. 12.

FIG. 12 shows a condition in the comparative example in FIG. 5 in which images of the leading edges of the light blocking members 191T, 191B are likely to be formed: the light blocking members 191T, 191B are blocking light with their leading edges positioned at the same height (y-axis position) as the center of curvature of the lens cells in the second row in the integrator optical system 2. FIG. 13 shows the result of a simulation of the illuminance distribution on the light valve 7 in FIG. 12. FIG. 14 is an enlargement of FIG. 12. Reference numerals 192 and 193 represent lines passing in the z-axis direction through the centers of curvature of the second lens cells from the x-axis in the second lens array 22. The leading edges of the light blocking members 191T, 191B are positioned near the first lens array 21.

As can be seen in FIG. 13, the light valve 7 has a line-like dark zone 194 in the x-axis direction. If the light blocking members 191T, 191B have straight leading edges, e.g., leading edges having a rectangular shape with a width d8 of about 0.5 mm, and the size in the y-axis direction of the cells in the second row in the first lens array is about 2.5 mm, then an image of the portion dy of the rectangular leading edges oriented in the y-axis direction is formed on the light valve 7, causing a line-like dark zone 194 in the x-axis direction on the light valve 7 on the light valve 7, as shown in FIG. 13.

Figure 11:
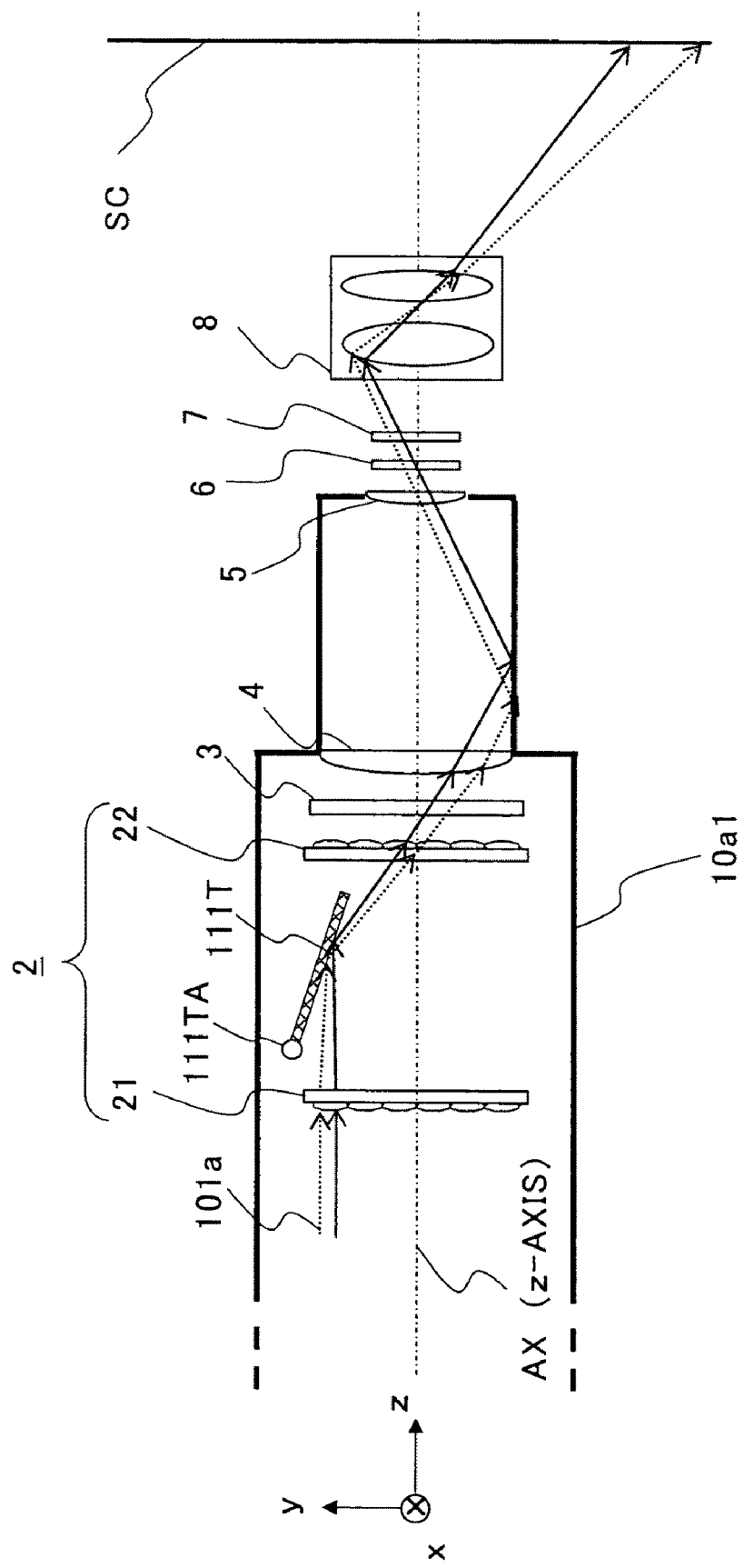
FIG. 11 is a drawing showing ray traces illustrating unwanted light generated, in the comparative example.

If the light blocking members 111T, 111B are swung in the direction opposite to the direction in the comparative example in FIG. 5, that is, if the light blocking members 111T, 111B are swung around an axis orthogonal to the optical axis so that their leading edges approach the second lens array 22, as shown in FIG. 11, then when the light blocking members 111T are turned (the lower light blocking member 111T is not shown), it is possible that light 101a (the dotted line) reflected on the light blocking members 111T will enter the second lens array 22 and be reflected again in the housing 10a1, and that this stray light will strike the screen SC. In addition to omitting the light blocking member opposite the light blocking member 111T, FIG. 8 shows only two lenses and no optical combining element in the projection optical system 8. In actuality, if the projection optical system 8 receives light that is not received by the light valve 7, this stray light may also be directed onto the screen SC. Therefore, the light blocking members are preferably turned in a direction parallel to the xy-plane.

As explained above, in the projection display apparatus 101 according to embodiment 1, because of the adoption of a structure in which the light blocking members 91L, 91R turn in an xy plane orthogonal to the optical axis AX, the turning mechanism 92 of the light blocking members 91L, 91R can be simplified. In addition, the shape of the leading edges 91LB, 91RB of the light blocking members 91L, 91R does not have to match the shape of the convex lenses in the second lens array 22; these edges can be straight, which simplifies the structure of the light blocking members in the light quantity adjusting means 9, and since this also applies to lens arrays with other shapes, a light quantity adjusting means 9 can be obtained that can be readily used in other apparatus.

In the projection display apparatus 101 according to embodiment 1, also because of the adoption of a structure in which the light blocking members 91L, 91R turn in an xy plane orthogonal to the optical axis AX, and because the turning range from a light blocking initiation position at which the light blocking members 91L, 91R, by being turned, start to block light in transit toward the second lens array 22 to a maximum light blocking position at which the light blocking members 91L, 91R block a maximum quantity of the light in transit toward the second lens array 22 is made equal to ninety degrees, the linearity of the variation in the quantity of light received by the light valve 7 with respect to the turning angle of the light blocking members 91L, 91R can be increased. The quantity of light received by the light valve 7 can therefore be adjusted continuously by the light quantity adjusting means 9, and an image with an adequate sense of contrast can be displayed continuously.

The shape of the light blocking members 91L and 91R is not limited to a rectangular shape. Parallelograms, trapezoids, or diamond shapes, for example, may be used as well.

Figure 15:
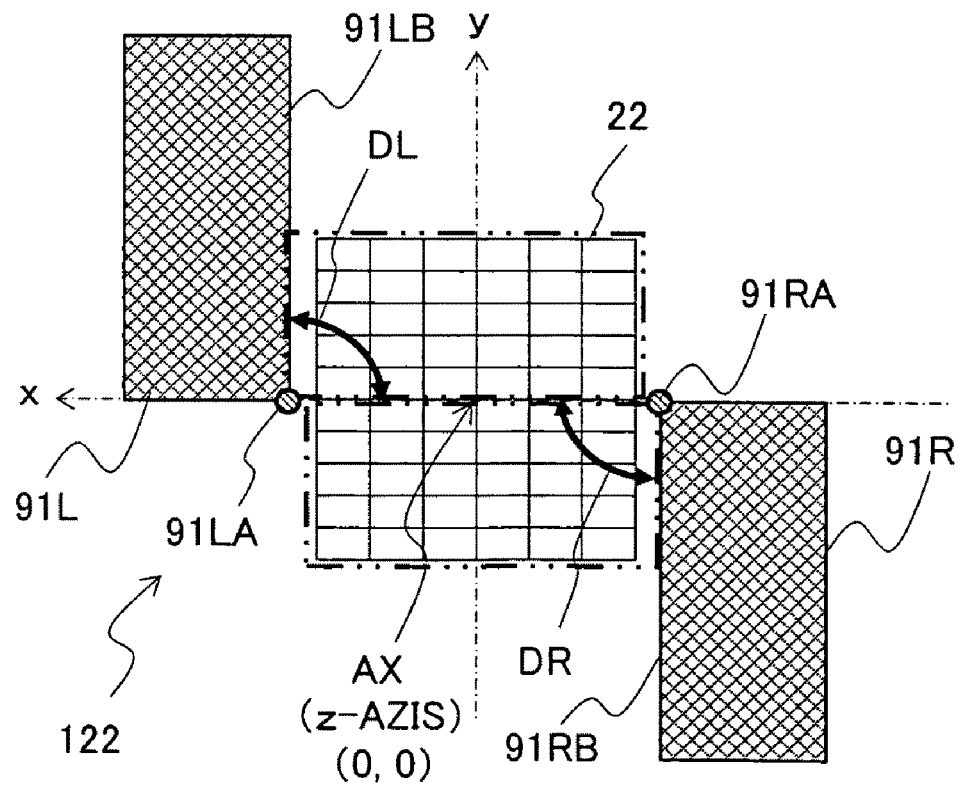
FIG. 15 is a front view (seen in the z-axis direction) schematically illustrating the structure and operation of the rotational light blocking section in a variation of embodiment 1.

FIG. 15 is a front view (seen in the z-axis direction) schematically illustrating the structure and operation of the rotational light blocking section in a variation of embodiment 1. A difference from the example shown in FIG. 2 is that the light blocking members 91L, 91R and rotational axes 91LA, 91RA shown in FIG. 15 are positioned so that two straight lines oriented in the z-axis direction passing through two points on the x-axis exterior to the two points of intersection where the x-axis intersects the y-axis-direction perimeter of the second lens array on the second lens array 22 coincide with the pair of rotational axes 91LA and so that the turning range from the light blocking initiation position at which the light blocking members 91L, 91R, by being turned, start to block light in transit toward the second lens array 22 to the maximum light blocking position at which the light blocking members 91L, 91R block the maximum quantity of the light in transit toward the second lens array is less than ninety degrees. Because the rotational axes 91LA, 91RA have been moved outward in this example, the length of the long sides of the light blocking members 91L, 91R is lengthened by an amount equal to the distance by which the rotational axes 91LA, 91RA have been moved outward, as shown in FIG. 15. An advantage of the arrangement in FIG. 15 is that the rotational axes 91LA, 91RA do not overlie the second lens array 22 as in FIG. 2. In other respects, the example in FIG. 15 is similar to the example in FIG. 2.

Embodiment 2

Figure 16:
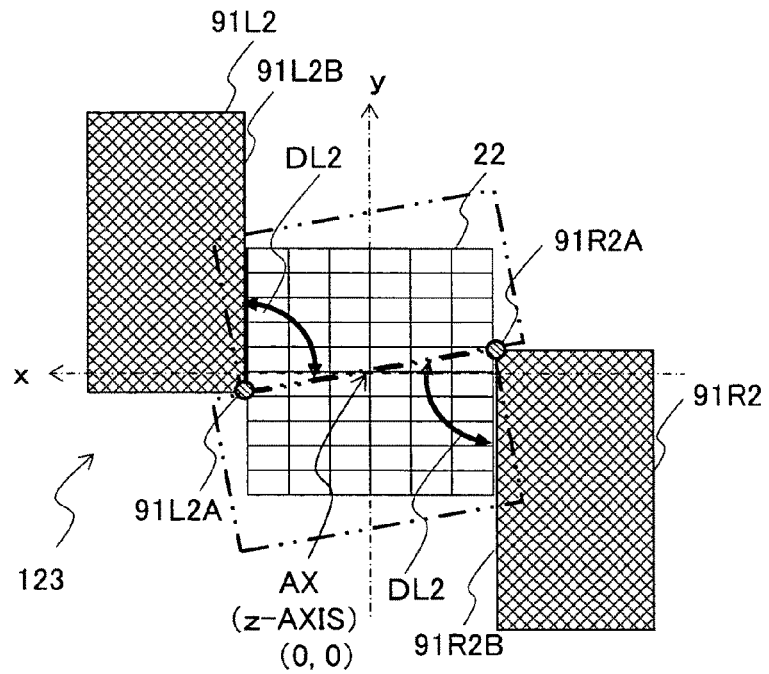
FIG. 16 is a front view (seen in the z-axis direction) schematically illustrating the structure and operation of the rotational light blocking section in embodiment 2.

FIG. 16 is a front view (seen in the z-axis direction) schematically illustrating the structure and operation of the rotational light blocking section in the projection display apparatus according to embodiment 2. The projection display apparatus according to embodiment 2 differs from the projection display apparatus 101 according to embodiment 1 in its adoption of the rotational light blocking section 123 shown in FIG. 16 in place of the rotational light blocking section 91 shown in FIG. 2. Accordingly, FIG. 1 will also be referred to in the description of embodiment 2.

The light blocking members 91L2, 91R2, rotational axes 91L2A, 91R2A and second lens array 22 are shown in FIG. 16 as seen from the z-axis direction. The light blocking members 91L2, 91R2 in FIG. 16 correspond to the light blocking members indicated by phantom lines in FIG. 9. As shown in FIG. 16, the pair of light blocking members 91L2, 91R2 are disposed in symmetric positions with respect to the optical axis AX, that is, the origin (0, 0) on the xy plane. As shown in FIG. 16, the pair of rotational axes 91L2A, 91R2A are also disposed in symmetric positions with respect to the origin (0, 0) on the xy plane. Moreover, the light blocking members 91L2, 91R2 and the rotational axes 91L2A, 91R2A are positioned so that when they are turned in the direction that increases the quantity of light blocked by the light blocking members 91L2, 91R2 (in FIG. 16, the direction that increases the quantity of light blocked is the clockwise direction for light blocking member 91L2, and is also the clockwise direction for light blocking member 91R2), the turning range from the light blocking initiation position of the light blocking members 91L2, 91R2 at which the light blocking members 91L2, 91R2, by being turned, start to block light in transit toward the second lens array (the position of the light blocking members 91L2, 91R2 indicated by solid lines in FIG. 16) to the maximum light blocking position of the light blocking members 91L2, 91R2 at which the light blocking members 91L2, 91R2 block a maximum quantity of the light in transit toward the second lens array (the position of the light blocking members 91L2, 91R2 indicated by phantom lines in FIG. 16) is less than ninety degrees.

Figure 17:
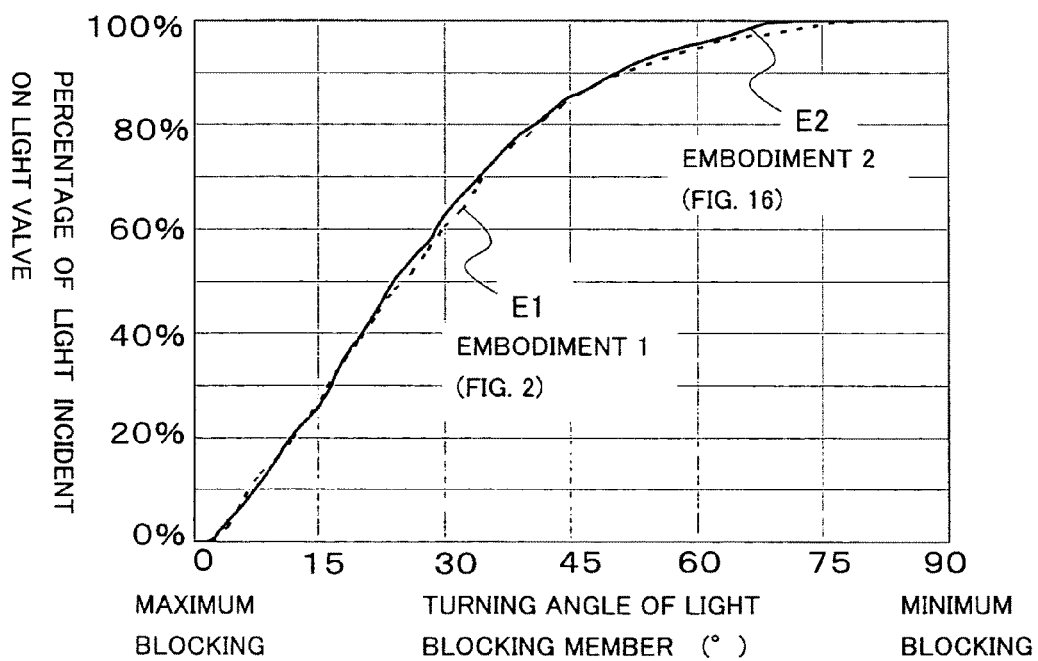
FIG. 17 is a drawing illustrating the result of a simulation of the relationship between the turning angle of the light blocking members and the percentage of light incident on the light valve in the projection display apparatus according to embodiment 2.

FIG. 17 is a drawing illustrating the result of a simulation of variations in the percentage of light with respect to the turning angle (°) for embodiment 1 (curve E1) shown in FIG. 2 and embodiment 2 (curve E2) shown in FIG. 16. The simulation was performed by varying the turning angle in steps of two degrees. The vertical axis in FIG. 17 indicates the relative percentage quantity (%) of light received by the light valve 7. The horizontal axis in FIG. 17 indicates the turning angle of the light blocking members. The curve E2 indicated by the solid line is for embodiment 2 in FIG. 16; the curve E1 indicated by the dotted line is for embodiment 1 in FIG. 2; both curves E1 and E2 can be seen to vary continuously (without any flat parts). Curve E1 rises slightly faster than curve E2 (in FIG. 17 the percentage of light begins to decrease when the turning angle becomes less than 90°), so by moving the positions of the rotational axes of the light blocking members parallel to the y-axis, it is possible to reduce the adjustment range of the quantity of light to improve the responsiveness of the light adjustment. Accordingly, when the edges 91L2B, 91R2B of the light blocking members 91L2, 91R2 that lead in the turning direction have a flat shape, the positions of the rotational axes 91L2A, 91R2A may be positions shifted in the y-axis direction as shown in FIG. 16.

Figure 18:
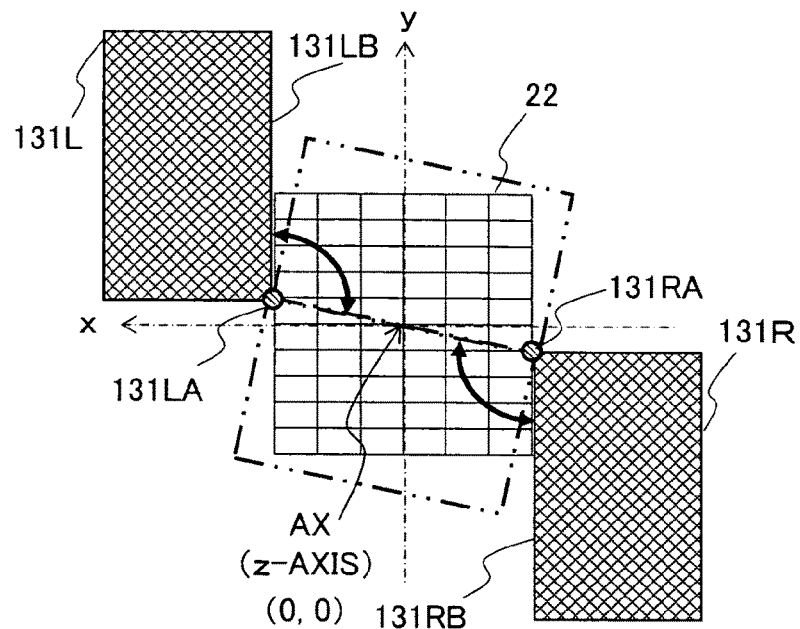
FIG. 18 is a front view (seen in the z-axis direction) schematically illustrating the structure and operation of the rotational light blocking section in another variation of embodiment 2.
Figure 19:
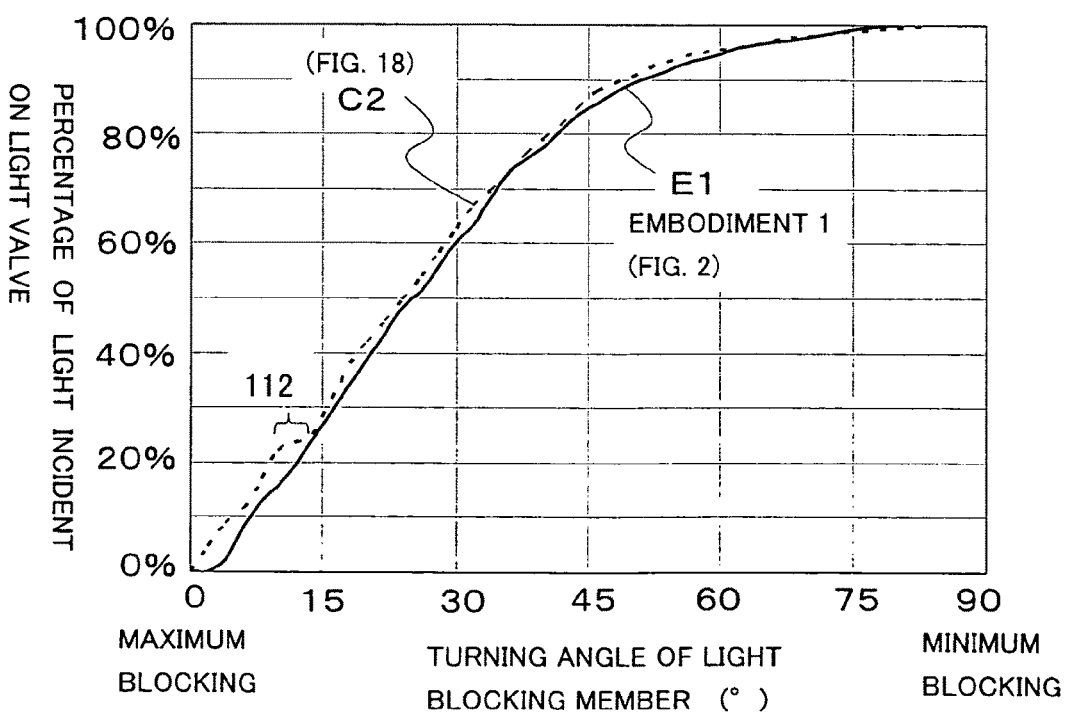
FIG. 19 is a drawing illustrating the result of a simulation of the relationship between the turning angle of the light blocking members and the percentage of light incident on the light valve in the projection display apparatus in the variation in FIG. 18.

FIG. 18 is a front view (seen in the z-axis direction) schematically illustrating the structure and operation of the rotational light blocking section in another exemplary projection display apparatus. FIG. 18 shows an example in which the rotational axes 131LA, 131RA of the light blocking members 131L, 131R are moved in the direction (a direction parallel to the y-axis) opposite to that in FIG. 16. FIG. 19 is a drawing illustrating the result of a simulation of the relationship between the turning angle of the light blocking members and the percentage of light incident on the light valve in the projection display apparatus in the variation in FIG. 18. The simulation was performed by varying the turning angle in steps of two degrees. In FIG. 19, the vertical axis represents percentage of light received by the light valve 7, while the horizontal axis represents the turning angle of the light blocking members in the configurations shown in FIGS. 2 and 18. The solid curve E1 represents the result in embodiment 1 in FIG. 2 while the dotted curve C2 represents the result in FIG. 18. As seen in FIG. 19, the curve C2 rises consistently when the percentage of light is about 25% or more, but continuity is lost in the flat region 112. Therefore, when there is an obtuse angle between the maximum light blocking position (the phantom lines in FIG. 18) and minimum completely open position (the solid lines in FIG. 18), the position of the rotational axis of the light blocking member is preferably not moved in the direction shown in FIG. 18. The 'minimum completely open position' is the light blocking initiation position at which the light blocking members, by being turned, start to block the light in transit toward the second lens array, while the 'maximum light blocking position' is the position at which the light blocking members block the maximum quantity of light in transit toward the second lens array.

The flat part 112 in the curve C2 in FIG. 19 is especially evident when the straight leading edges 131LB, 131RB of the light blocking members 131L, 131R match an interface (joined edge) extending in the x-axis direction of adjacent lens cells (convex lenses) in the second lens array, in other words, when the leading edges 131LB, 131RB of the light blocking members 131L, 131R block only a dark region between the lens cells extending in the x-axis direction. This is because the light received on the light valve 7 does not vary within the range where only light in the dark region between the lens cells is blocked. Therefore, looking in the z-axis direction, the leading edges 131LB, 131RB of the light blocking members 131L, 131R preferably do not align with any joined edge between adjacent lens cells adjoining in the x-axis direction (or y-axis direction). other words, the light blocking members 131L, 131R are preferably disposed so that the maximum light blocking position and the minimum completely open position do not make an obtuse angle but make an angle less than 90 degrees.

Figure 20:
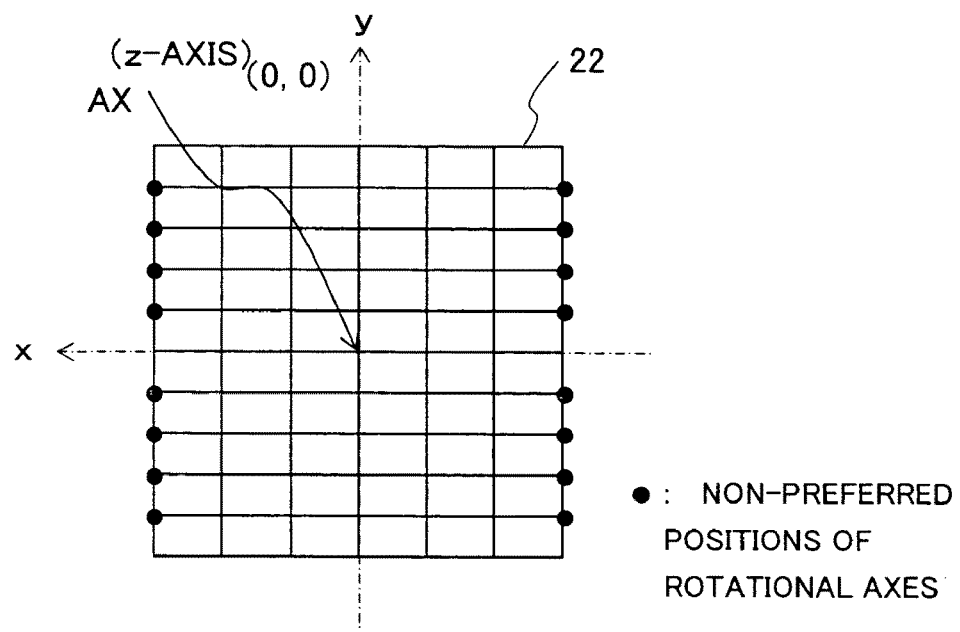
FIG. 20 is a front view (seen in the z-axis direction) illustrating non-preferred positions of the rotational axes when the axis is shifted in the y-axis direction in embodiment 2 and embodiment 6.

FIG. 20 is a front view (seen in the z-axis direction) illustrating non-preferred positions of the rotational axes when the rotational axes 91L2A, 91R2A of the light blocking members 91L2, 91R2 are disposed in positions shifted in the y-axis direction, especially when the edges that lead in the turning direction when the light blocking members are turned to increase the quantity of light blocked are parallel to the x-axis. If the rotational axes 91L2A, 91R2A of the light blocking members 91L2, 91R2 are disposed at the positions of the black dots in FIG. 20, the dark parts on the x-axis shown in FIG. 8 are positioned at joined edges of cells (convex lenses) that are adjacent in the y-axis direction, so the flat part 112 in FIG. 19 occurs at an intermediate light blocking position. Accordingly, the rotational axes 91L2A, 91R2A of the light blocking members 91L2, 91R2 are preferably not disposed at or near the positions of the black dots in FIG. 20. For a similar reason, the rotational axes of the light blocking members are preferably not disposed on the lines extending in the x-axis direction through the black dots in FIG. 20.

As explained above, in the projection display apparatus according to embodiment 2, because of the adoption of a structure in which the light blocking members 91L2, 91R2 turn in an xy plane orthogonal to the optical axis AX, the turning mechanism 92 of the light blocking members 91L2, 91R2 can be simplified. In addition, the shape of the leading edges 91LB, 91RB of the light blocking members 91L2, 91R2 does not have to match the shape of the convex lenses in the second lens array 22; these edges can be straight, which simplifies the structure of the light blocking members in the light quantity adjusting means 9, and since this also applies to lens arrays with other shapes, a light quantity adjusting means 9 can be obtained that can be readily used in other apparatus.

In the projection display apparatus according to embodiment 2, also because of the adoption of a structure in which the light blocking members 91L2, 91R2 turn in an xy plane orthogonal to the optical axis AX, and because the turning range from the light blocking initiation position at which the light blocking members 91L2, 91R2, by being turned, start to block light in transit toward the second lens array 22 to the maximum light blocking position at which the light blocking members 91L2, 91R2 block a maximum quantity of the light in transit toward the second lens array 22 is made less than ninety degrees, the continuity of variation in the quantity of light received by the light valve 7 with respect to the turning angle of the light blocking members 91L2, 91R2 can be increased. The quantity of light received by the light valve 7 can therefore be adjusted continuously by the light quantity adjusting means 9, and an image with an adequate sense of contrast can be displayed continuously.

Figure 21:
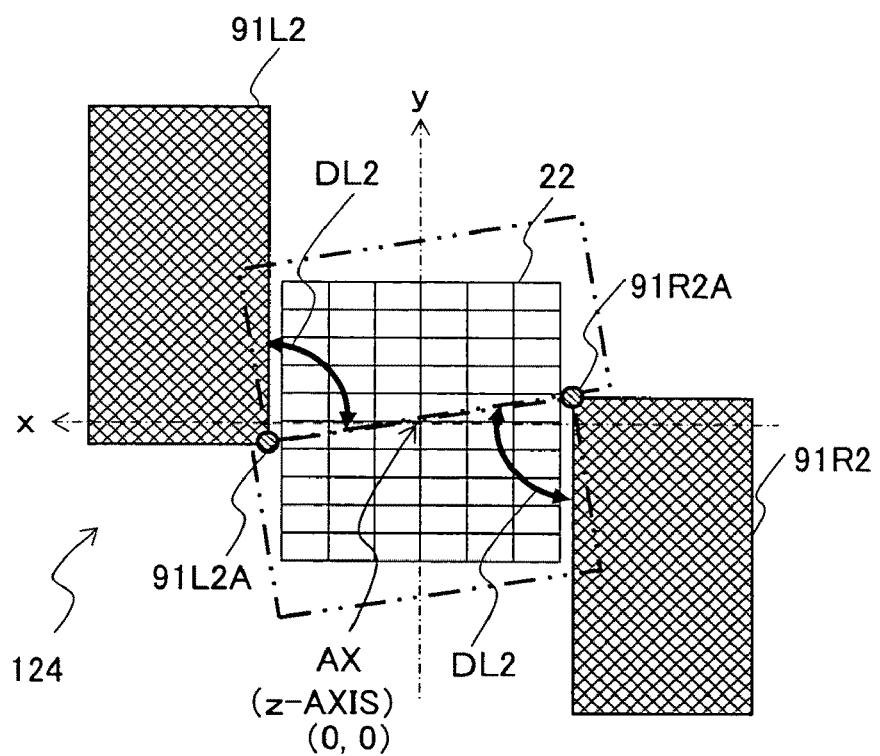
FIG. 21 is a front view (seen in the z-axis direction) schematically illustrating the structure and operation of the rotational light blocking section in another variation of embodiment 2.

FIG. 21 is a front view (seen in the z-axis direction) schematically illustrating the structure and operation of the rotating projection display apparatus in a variation of embodiment 2. A difference from the example shown in FIG. 2 is that the light blocking members 91L2, 91R2 and the rotational axes 91L2A, 91R2A shown in FIG. 21 are positioned so that two straight lines oriented in the z-axis direction passing through two points on the x-axis exterior to the two points of intersection where the x-axis intersects the y-axis-direction perimeter of the second lens array 22 on the second lens array 22 coincide with the pair of rotational axes 91L2A, 91R2A so that the turning range from the light blocking initiation position at which the light blocking members 91L2, 91R2, by being turned, start to block light in transit toward the second lens array 22 to the maximum light blocking position at which the light blocking members 91L2, 91R2 block the maximum quantity of the light in transit toward the second lens array 22 is less than ninety degrees. Because the rotational axes 91L2A, 91R2A have been moved outward in this example, the length of the long sides of the light blocking members 91L2, 91R2 is longer by an amount equal to the distance by which the rotational axes 91L2A, 91R2A have been moved outward, as shown in FIG. 21. An advantage of the arrangement in FIG. 21 is that the rotational axes 91L2A, 91R2A do not pass through the second lens array 22. In other respects, the example in FIG. 21 is similar to the example in FIG. 16.

Regarding points other than the above, embodiment 2 is the same as embodiment 1.

Embodiment 3

Figure 22:
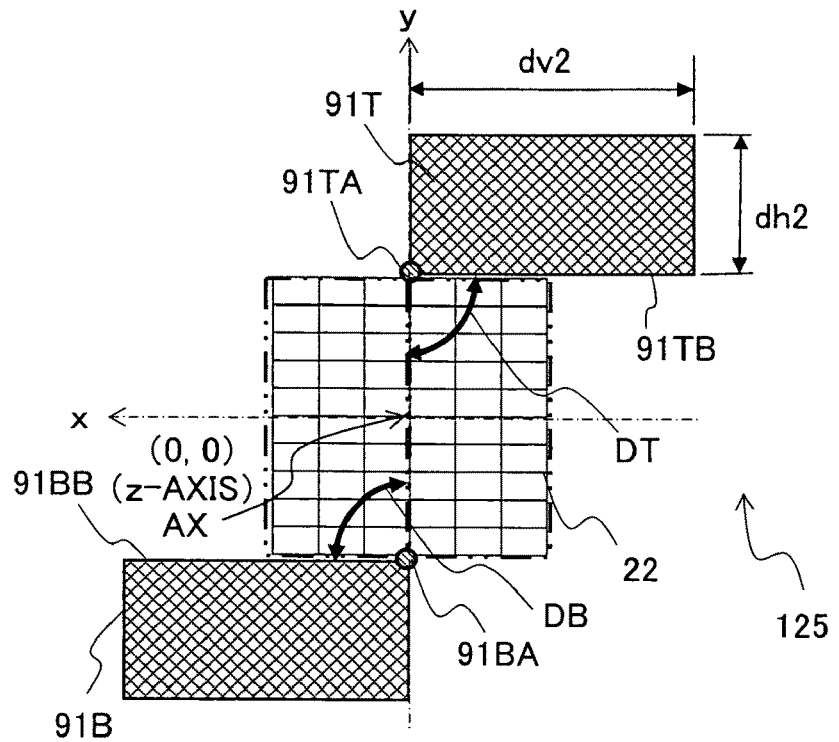
FIG. 22 is a front view (seen in the z-axis direction) schematically illustrating the structure and operation of the rotational light blocking section according to embodiment 3.

FIG. 22 is a front view (seen in the z-axis direction) schematically illustrating the structure and operation of the rotational light blocking section 125 in, the projection display apparatus according to embodiment 3. The projection display apparatus according to embodiment 3 differs from the projection display apparatus 101 according to embodiment 2 in its adoption of the rotational light blocking section 125 shown in FIG. 22 in place of the rotational light blocking section 91 shown in FIG. 2. Accordingly, FIG. 1 will also be referred to in the description of embodiment 2.

The light quantity adjusting means 9 of embodiment 3 comprises a pair of light blocking members 91T, 91B for blocking light in transit from the first lens array 21 to the second lens array 22, a pair of rotational axes 91TA, 91BA for rotatably supporting each of the light blocking members 91T, 91B on an xy plane orthogonal to the z-axis, a turning mechanism 92 for turning the light blocking members 91T, 91B, a turning control unit 93 for controlling the operation of the turning mechanism 92, and a signal detector 94 that detects image signal input to the light valve 7 and calculates a percentage of light (the percentage of light to be received by the light valve 7) based on the detection result. The pair of light blocking members 91T, 91B and the pair of rotational axes 91TA, 91BA constitute the rotational light blocking section 125. The turning control unit 93 controls the turning of the light blocking members 91T, 91B according to percentage of light calculated by the signal detector 94.

As shown in FIG. 22, the pair of light blocking members 91T, 91B are disposed in symmetric positions with respect to the optical axis AX, that is, the origin (0, 0) of the xy plane. Also, the pair of rotational axes 91TA, 91BA are disposed in symmetric positions with respect to the origin (0, 0) of the xy plane. Moreover, the light blocking members 91T, 91B and their rotational axes 91TA, 91BA are positioned so that when they are turned in the direction that increases the quantity of light blocked by the light blocking members 91T, 91B (in FIG. 22, the direction that increases the quantity of light blocked is the clockwise direction for light blocking member 91T, and is also the clockwise direction for light blocking member 91B), the turning range from the light blocking initiation position of the light blocking members 91T, 91B at which the light blocking members 91T, 91B, by being turned, start to block light in transit toward the second lens array 22 (the position of the light blocking members 91T, 91B indicated by solid lines in FIG. 2) to the maximum light blocking position of the light blocking members 91T, 91B at which the light blocking members 91T, 91B block a maximum quantity of the light in transit toward the second lens array 22 (the position of the light blocking members 91T, 91B indicated by phantom lines in FIG. 2) is equal to ninety degrees.

When the optical axis AX is at the origin (0, 0) in the xy plane, the rotational axis 91TA of the light blocking member 91T is on the positive part of the y-axis (above the optical axis AX in FIG. 22), and the rotational axis 91BA of the light blocking member 91B is on the negative part of the y-axis (below the optical axis AX in FIG. 22). As shown in FIG. 22, light blocking member 91T is installed so that it can turn in the xy plane in the direction of arrow DT, with rotational axis 91TA as the center of rotation. Light blocking member 91B is installed so that it can turn in the xy plane in the direction of arrow DB, with rotational axis 91BA as the center of rotation. The rotational light blocking section 125 is rotatably driven by the turning mechanism 92 in response to control signals from the turning control unit 93 so as to turn toward the optical axis AX from both sides of the light path (thereby intruding into the light path) or to turn so as to withdraw from the light path from both sides, and adjusts the quantity of light (received by the light valve 7) according to the amount by which it intrudes into the light path. The edges 91TB, 91BB of the light blocking members 91T, 91B that lead in the turning direction when the light blocking members 91T, 91B are turned in the direction that increases the quantity of light blocked by the light blocking members 91T, 91B have a straight shape.

As also shown in FIG. 22, when the light blocking members 91T, 91B are disposed in the y-axis direction, the length dh2 of the short edges and the length dv2 of the long edges of the light blocking members 91T, 91B preferably satisfy the following equations (3) and (4).

$$dh2 \geq V1+V2+V3 \quad (3)$$

$$dv2 \geq \{(2\times(H1+H2+H3+H4+H5))^2+(V1+V2+V3)^2\}^{0.5} \quad (4)$$

Figure 23:
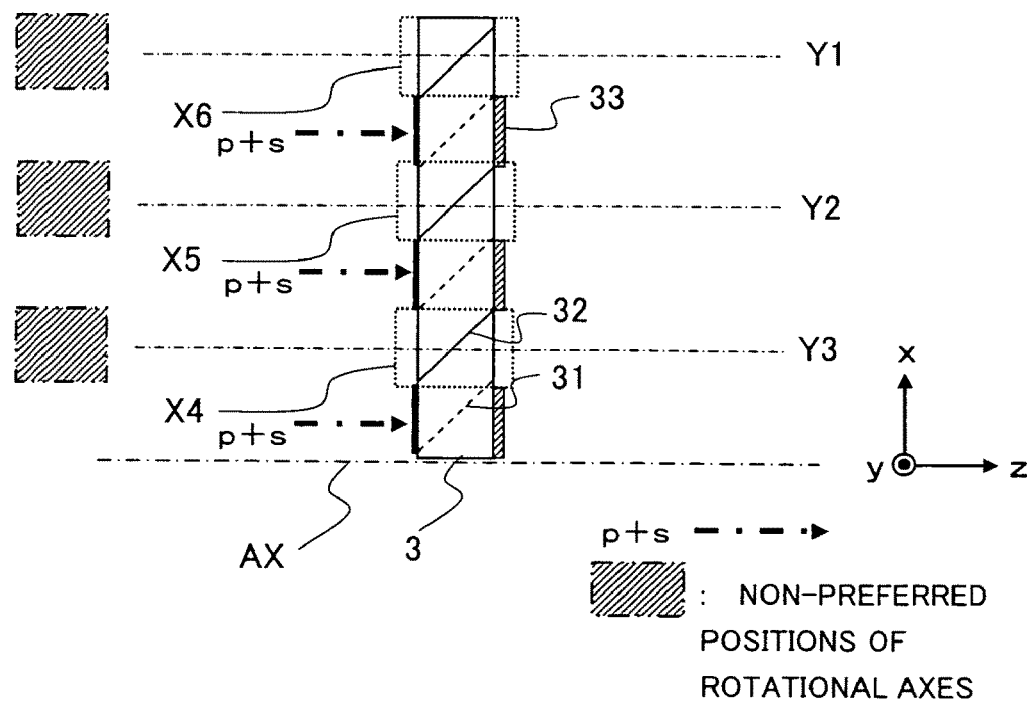
FIG. 23 is a front view (seen in the y-axis direction) illustrating non-preferred positions of the rotational axes when the axes are shifted in the x-axis direction in embodiments 3 and 7.
Figure 24:
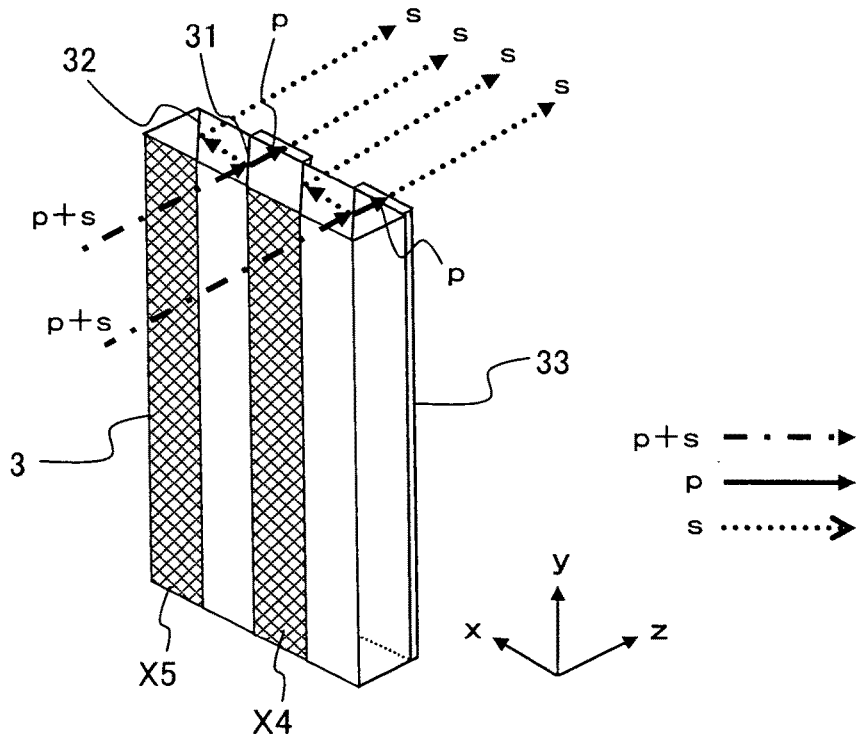
FIG. 24 is a schematic perspective view of the polarization conversion element in FIG. 23.

FIG. 23 is a front view (seen in the negative y-axis direction) illustrating non-preferred positions of the rotational axes 91TA, 91BA when the rotational axes 91TA, 91BA of the light blocking members 91T2, 91B2 are disposed in positions shifted in the x-axis direction, especially when the edges that lead in the turning direction when the light blocking members 91T2, 91B2 are turned to increase the quantity of light blocked are parallel to the y-axis. FIG. 24 is a schematic perspective view of the polarization conversion element 3 in FIG. 23. In FIG. 23, p-polarized and s-polarized light (p+s) enters the regions shown with thick solid lines (light-transmitting regions), but does not enter other regions (non-light-transmitting regions).

Figure 25:
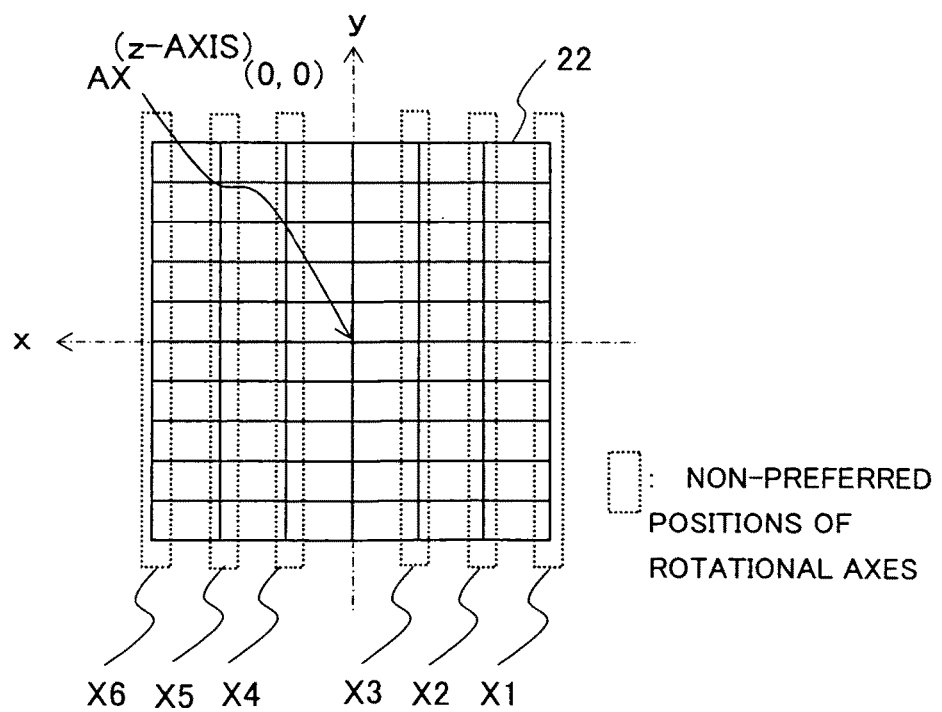
FIG. 25 is a drawing illustrating a range in which it is preferable that the rotational axes not be positioned in embodiments 3 and 7.

Examples of the regions where light does not enter the polarization conversion element 3 (corresponding to the non-light-transmitting regions cross-hatched in FIG. 24) are surrounded by dotted lines in FIGS. 23 and 25 (X1, X2, X3, X4, X5, X6). The dotted-line regions X1, X2, X3, X4, X5, X6 nearly coincide with a joined edge between adjacent lens cells (convex lenses) in the second lens array 22 that adjoin in the x-axis direction. Therefore, it is desirable to position the rotational axes 91TA, 91BA of the light blocking members 91T2, 91B2 at a position other than the posit of a joined edge between adjacent lens cells (convex lenses) in the second lens array 22 that adjoin in the x-axis direction. It is particularly desirable that the rotational axes 91TA, 91BA not be positioned in the y-axis-direction positions of the regions (hatched regions in FIG. 23) in which light does not enter the polarization conversion element 3, and especially desirable that they not be positioned on the axes Y1, Y2, Y3 at the centers of these regions. A non-light-transmitting region is a region which outputs invalid linearly polarized light, that is, a region where all incident light is p-polarized (invalid linearly polarized light) and not s-polarized (valid linearly polarized light). Accordingly, the invalid regions, which were normally formed by a light blocking plate (not shown) disposed between the second lens array 22 and the polarization conversion element 3, are rendered into non-light-transmitting regions. In other words, the non-light-transmitting regions are regions where any light incident on the regions is output as invalid linearly polarized light. Whereas p-polarized light entering a non-light-transmitting region is output therefrom as p-polarized light (invalid linearly polarized light) with no additional polarization, s-polarized light entering a non-transmission region is reflected by the reflective film, converted to p-polarized light (invalid linearly polarized light) by the λ/2 phase plate 33, and then output.

As explained above, effects similar to those obtained from embodiment 1 can also be obtained from a projection display apparatus according to embodiment 3.

In embodiment 3, as in FIG. 15 (the variation of embodiment 1), the light blocking members 91T, 91B and rotational axes 91TA, 91BA may be positioned so that two straight lines oriented in the z-axis direction passing through two points on the y-axis exterior to the two points of intersection where the y-axis intersects the x-axis-direction perimeter of the second lens array 22 on the second lens array 22 coincide with the pair of rotational axes and the turning range is less than ninety degrees. Effects similar to those obtained in FIG. 15 can be obtained.

In embodiment 3, as in FIG. 16 (embodiment 2), the light blocking members 91T, 91B and rotational axes 91TA, 91BA may be positioned so that two straight lines oriented in the z-axis direction passing through two points where a straight line slanted with respect to the y-axis intersects the x-axis-direction perimeter of the second lens array 22 on the second lens array 22 coincide with the pair of rotational axes 91TA, 91BA and the turning range is less than ninety degrees, and the angle made by the slanted line with respect to the y-axis may be less than the angle made by a line joining the optical axis and a corner of the second lens array 22. Effects similar to those obtained in FIG. 16 can be obtained.

In embodiment 3, as in FIG. 21 (the variation of embodiment 2), the light blocking members 91T, 91B and rotational axes 91TA, 91BA may be positioned so that two straight lines oriented in the z-axis direction passing through two points exterior in the y-axis direction to the two points of intersection where a straight line slanted with respect to the y-axis intersects the x-axis-direction perimeter of the second lens array 22 on the second lens array 22 coincide with the pair of rotational axes 91TA, 91BA and the turning range is less than ninety degrees, and the angle made by the slanted line with respect to the y-axis may be less than the angle made by a line joining the optical axis AX and a corner of the second lens array 22. Effects similar to those obtained in configuration in FIG. 21 can be obtained.

Regarding points other than the above, embodiment 3 is the same as embodiment 1 or 2.

Embodiment 4

Figure 26:
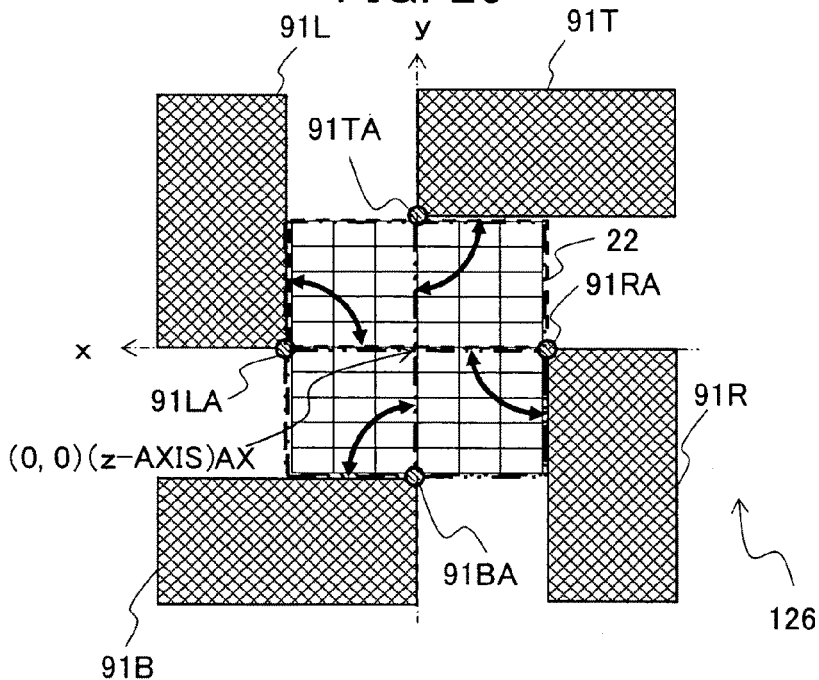
FIG. 26 is a front view (seen in the z-axis direction) schematically illustrating the structure and operation of the rotational light blocking section according to embodiment 4.

FIG. 26 is a front view (seen in the z-axis direction) schematically illustrating the structure and operation of the rotational light blocking section 126 in the projection display apparatus according to embodiment 4. The projection display apparatus according to embodiment 4 differs from the projection display apparatus 101 according to embodiment 1 in its adoption of the rotational light blocking section 126 shown in FIG. 26 in place of the rotational light blocking section 91 shown in FIG. 2. Accordingly, FIG. 1 will also be referred to in the description of embodiment 4. Elements in FIG. 26 that correspond to elements in FIGS. 2 and 22 have the same reference characters.

As shown in FIG. 26, the rotational light blocking section 126 of the projection display apparatus according to embodiment 4 comprises two pairs of light blocking members 91L, 91R and 91T, 91B, and two pairs of rotational axes 91LA, 91Ra and 91TA, 91BA. Light blocking members 91L, 91R and their rotational axes 91LA, 91RA are positioned so that two straight lines oriented in the z-axis direction passing through two points of intersection where the x-axis intersects the y-axis-direction perimeter of the second lens array 22 on the second lens array 22 coincide with the pair of rotational axes 91LA, 91RA, and so that the turning range of the light blocking members 91L, 91R is equal to ninety degrees. Light blocking members 91T, 91B and their rotational axes 91TA, 91BA are positioned so that two straight lines oriented in the z-axis direction passing through two points of intersection where the x-axis intersects the y-axis-direction perimeter of the second lens array 22 on the second lens array 22 coincide with the pair of rotational axes 91TA, 91BA, and so that the turning range of the light blocking members 91L, 91R is equal to ninety degrees.

As shown in FIG. 26, providing four light blocking members 91L, 91R, 91T, 91B makes the change in percentage of light due to the turning angle of the light blocking members greater than in FIG. 2, thereby improving the responsiveness.

Figure 27:
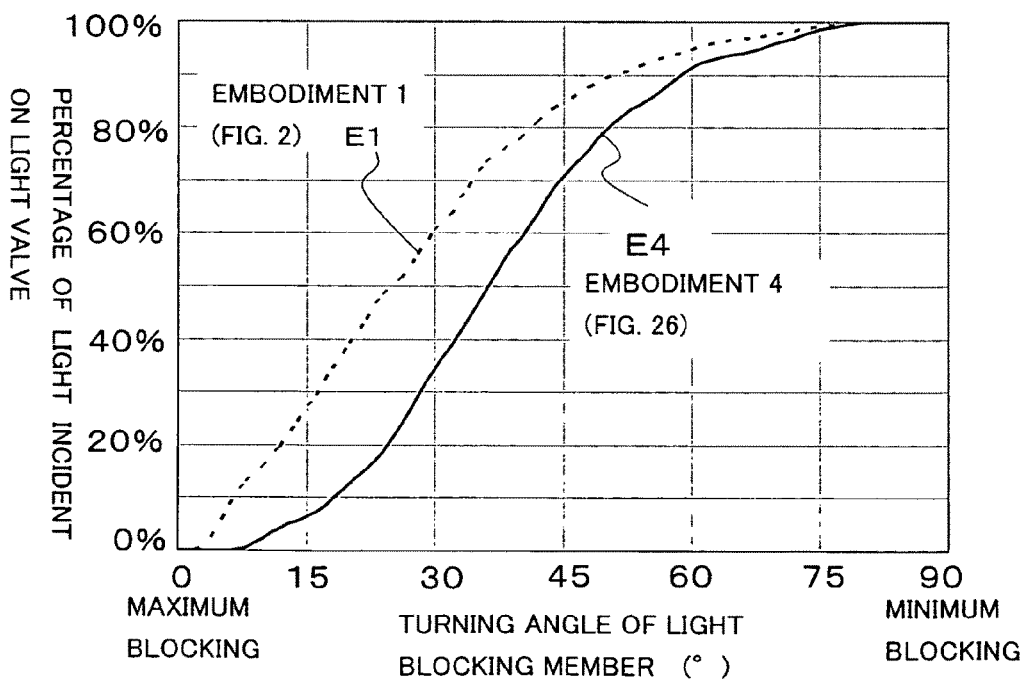
FIG. 27 is a drawing illustrating the result of a simulation of the relationship between the turning angle of the light blocking members and the percentage of light incident on the light valve in the projection display apparatus according to embodiment 4.

FIG. 27 is a drawing illustrating the result of a simulation of the relationship between the turning angle and the percentage of light in FIGS. 2 and 26. The simulation was performed by varying the turning angle in steps of two degrees. In FIG. 27, the vertical axis represents percentage of light received by the light valve 7. The horizontal axis represents the turning angle of the light blocking members in FIGS. 2 and 26. Curve E4 shows the relationship in FIG. 26 (embodiment 4); curve E1 shows the relationship in FIG. 2 (embodiment 1). The curve for embodiment 4 has excellent continuity with no flat parts in which the percentage of light does not vary according to the change in the turning angle. In addition, the turning angle necessary for changing the percentage of light from 80% to 100% is smaller in the curve (E4) for embodiment 4 than in curve E1, so with curve E4, the response at the high end of the gray scale (80% to 100%) is improved. Therefore, providing four light blocking members 91L, 91R, 91T, 91B as shown in FIG. 26 enables the quantity of light to be adjusted continuously with high responsiveness. Furthermore, since the opening has a point symmetric shape, there are no illuminance irregularities on the light valve 7 when the percentage of light is about 15%.

As explained above, effects similar to those obtained in embodiment 1 can also be obtained in the projection display apparatus according to embodiment 4.

As in FIG. 15 (the variation of embodiment 1), the light blocking members 91L, 91R and rotational axes 91LA, 91RA in embodiment 4 may be positioned so that two straight lines oriented in the z-axis direction passing through two points on the x-axis exterior to the two points of intersection where the x-axis intersects the y-axis-direction perimeter of the second lens array 22 on the second lens array 22 coincide with the pair of rotational axes 91LA, 91RA and the turning range is less than ninety degrees. Also, in embodiment 4, as in FIG. 15 (the variation of embodiment 1), the light blocking members 91T, 91B and rotational axes 91TA, 91BA may be positioned so that two straight lines oriented in the z-axis direction passing through two points on the y-axis exterior to the two points of intersection where the y-axis intersects the x-axis-direction perimeter of the second lens array 22 on the second lens array 22 coincide with the pair of rotational axes and the turning range is less than ninety degrees. Effects similar to those in FIG. 15 can be obtained.

Alternatively, as in FIG. 16 (embodiment 2), the light blocking members 91L, 91R and rotational axes 91LA, 91RA in embodiment 4 may be positioned so that two straight lines oriented in the z-axis direction passing through two points where a straight line slanted with respect to the x-axis intersects the y-axis-direction perimeter of the second lens array 22 on the second lens array 22 coincide with the pair of rotational axes 91LA, 91RA and the turning range is less than ninety degrees, and the angle made by the slanted line with respect to the x-axis may be less than the angle made by a line joining the optical axis and a corner of the second lens array 22. Alternatively, the light blocking members 91T, 91B and rotational axes 91TA, 91BA may be positioned so that two straight lines oriented in the z-axis direction passing through two points where a straight line slanted with respect to the y-axis intersects the x-axis-direction perimeter of the second lens array 22 on the second lens array 22 coincide with the pair of rotational axes 91TA, 91BA and the turning range is less than ninety degrees, and the angle made by the slanted line with respect to the y-axis may be less than the angle made by a line joining the optical axis and a corner of the second lens array 22. Effects similar to those in FIG. 16 can then be obtained.

Alternatively, as in FIG. 21 (the variation of embodiment 2), the light blocking members 91L, 91R and rotational axes 91LA, 91RA in embodiment 4 may be positioned so that two straight lines oriented in the z-axis direction passing through two points exterior in the x-axis direction to the two points of intersection where a straight line slanted with respect to the x-axis intersects the y-axis-direction perimeter of the second lens array 22 on the second lens array 22 coincide with the pair of rotational axes 91LA, 91RA and the turning range is less than ninety degrees, and the angle made by the slanted line with respect to the x-axis may be less than the angle made by a line joining the optical axis AX and a corner of the second lens array 22. Alternatively, the light blocking members 91T, 91B and rotational axes 91TA, 91BA may be positioned so that two straight lines oriented in the z-axis direction passing through two points exterior in the y-axis direction to the two points of intersection where a straight line slanted with respect to the y-axis intersects the x-axis-direction perimeter of the second lens array 22 on the second lens array 22 coincide with the pair of rotational axes 91TA, 91BA and the turning range is less than ninety degrees, and the angle made by the slanted line with respect to the y-axis may be less than the angle made by a line joining the optical axis AX and a corner of the second lens array 22. Effects similar to those obtained in FIG. 21 can then be obtained.

Regarding points other than the above, embodiment 4 is the same as embodiments 1 to 3.

Embodiment 5

Figure 28:
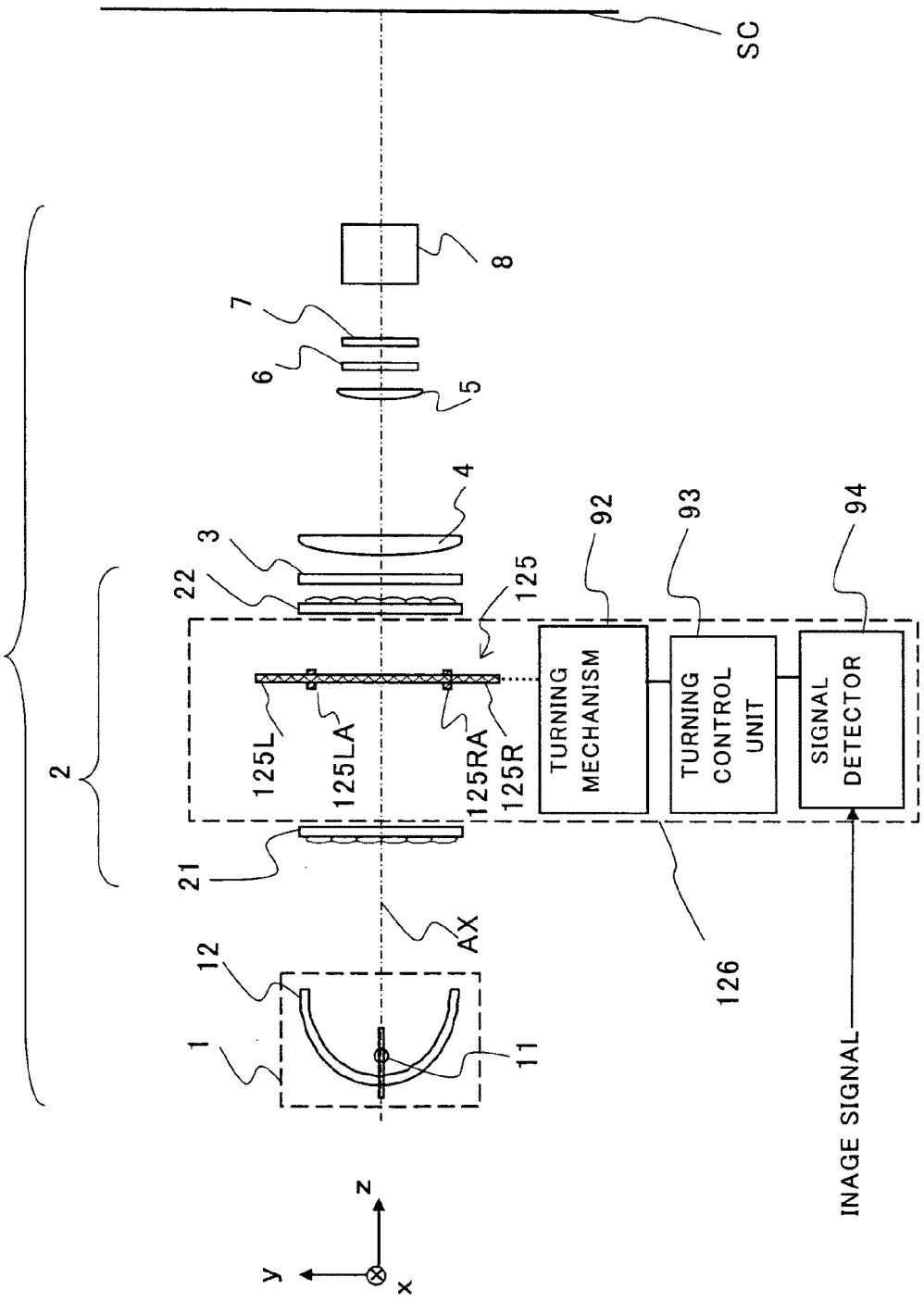
FIG. 28 is a front view schematically illustrating the structure of the projection display apparatus according to embodiment 5.
Figure 29:
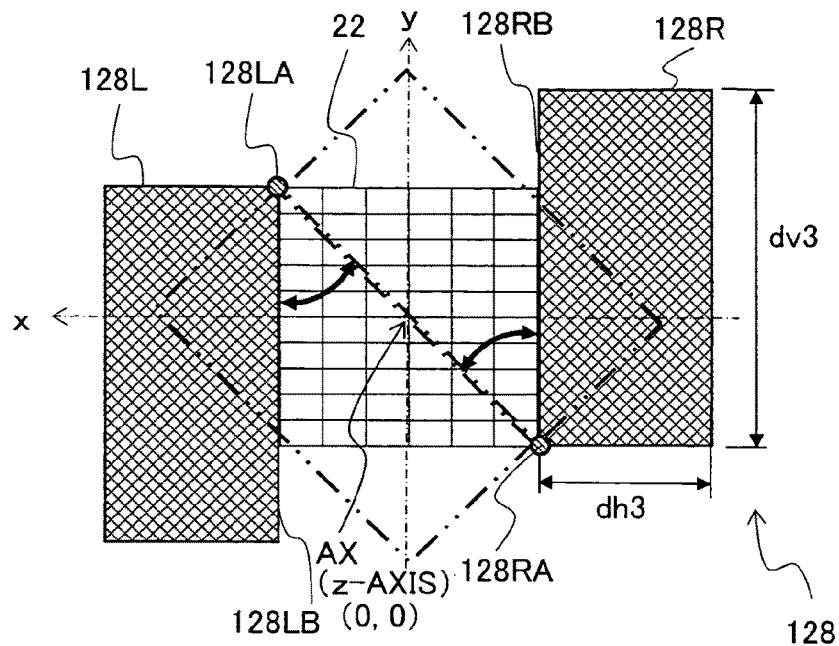
FIG. 29 is a front view (seen in the z-axis direction) schematically illustrating the structure and operation of the rotational light blocking section in embodiment 5.

FIG. 28 is a drawing that schematically illustrates the structure of the projection display apparatus 105 according to embodiment 5. Elements in FIG. 28 that correspond to elements in FIG. 1 have the same reference characters. FIG. 29 is a front view (seen in the z-axis direction) schematically illustrating the structure and operation of the rotational light blocking section 128 according to embodiment 5. The projection display apparatus 105 according to embodiment 5 differs from the projection display apparatus 101 according to embodiment 1 in its adoption of the rotational light blocking section 128 shown in FIG. 29 in place of the rotational light blocking section 91 shown in FIG. 2.

As shown in FIG. 29, the rotational light blocking section 128 comprises a pair of light blocking members 128L, 128R, and rotational axes 128LA, 128RA that rotatably support the light blocking members 128L, 128 with respect to the housing (not shown) of the projection display apparatus 105 on the xy-plane. The pair of light blocking members 128L, 128R, and the pair of rotational axes 128LA, 128RA are disposed in symmetric positions with respect to the optical axis AX, that is, the origin (0, 0) of the xy coordinate system. The light blocking members 128L, 128R and the rotational axes 128LA, 128RA are positioned so that when they are turned in the direction that increases the quantity of light blocked by the light blocking members 128L, 128R, the turning range from the light blocking initiation position of the light blocking members 128L, 128R at which the light blocking members 128L, 128R, by being turned, start to block light in transit toward the second lens array 22 (minimum completely open position; the position of the light blocking members 128L, 128R indicated by solid lines in FIG. 29) to the maximum light blocking position of the light blocking members 128L, 128R at which the light blocking members 128L, 128R block a maximum quantity of the light in transit toward the second lens array 22 (maximum light blocking position; the position of the light blocking members 128L, 128R indicated by phantom lines in FIG. 29) is less than ninety degrees. The light blocking members 128L, 128R, and the rotational axes 128LA, 128RA are positioned so that when the light blocking members 128L, 128R are in the light blocking initiation position, at least a part of the light blocking members 128L, 128R is aligned in the z-axis direction with a line in the x-axis direction intersecting the optical axis AX. As shown in FIG. 29, the light blocking members 128L, 128R and the rotational axes 128LA, 128RA are positioned so that two lines in the z-axis direction passing through two corners of the second lens array 22 in symmetric positions with respect to the optical axis AX coincide with the pair of rotational axes 128LA, 128RA. The light blocking members 128L, 128R may be differently positioned in the z-axis direction.

As shown in FIG. 29, the light blocking members 128L, 128R are rotatably driven by the turning mechanism 92 so as to turn symmetrically with respect to the optical axis AX from both sides of the light path, thereby adjusting the quantity of light received by the light valve 7 by adjusting the quantity of light blocked according to the amount by which they intrude into the light path. The edges 128LB, 128RB of the light blocking members 128L, 128R that lead in the turning direction when turned in the direction that increases the quantity of light blocked have a straight shape.

Figure 30:
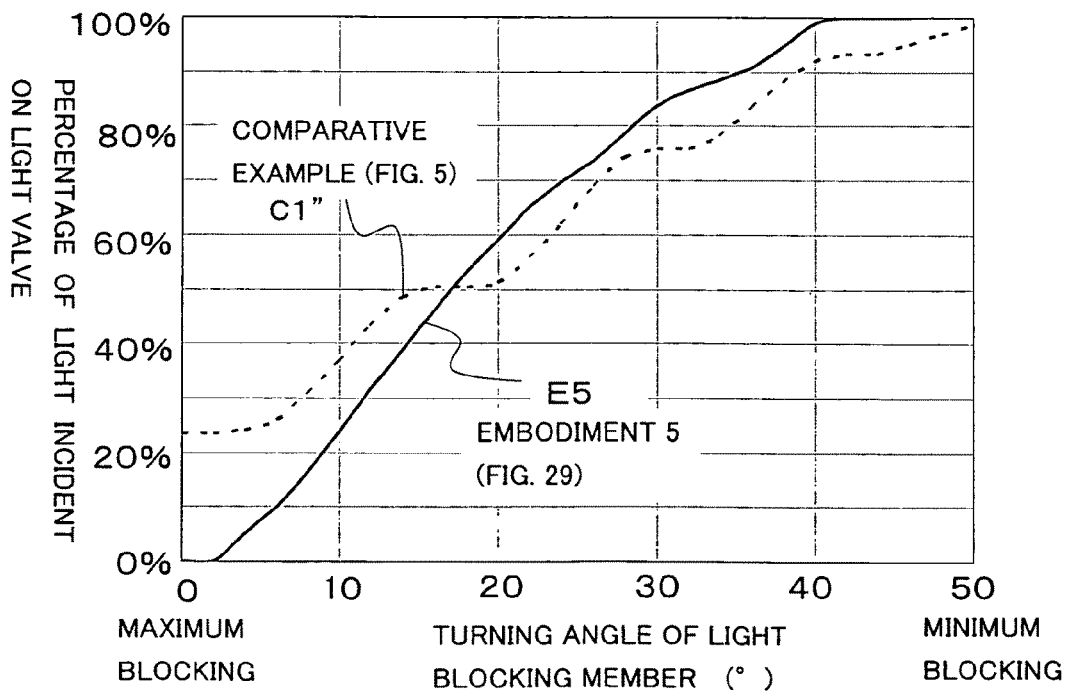
FIG. 30 is a drawing illustrating the result of a simulation of the relationship between the turning angle of the rotational light blocking members and the percentage of light incident on the light valve in the projection display apparatus according to embodiment 5.

FIG. 30 is a drawing illustrating the result of a simulation of the relationship between the percentage of light received by the light valve and the turning angle) (°) of the light blocking members of the projection display apparatus according to embodiment 5. FIG. 30 is a drawing illustrating the result of a simulation of variations in the percentage of light with respect to the turning angle) (°) in FIGS. 29 and 5. The simulation was performed by varying the turning angle in steps of two degrees. The vertical axis in FIG. 30 indicates the relative percentage quantity of light received by the light valve 7. The horizontal axis in FIG. 30 indicates the turning angle of the light blocking members in embodiment 5 in FIG. 29 (curve E5) and in the comparative example in FIG. 5 (curve C1"). Variations in the turning angle and percentage of light received by the light valve 7 in FIG. 29 are indicated by curve E5; curve C1" represents the variations in FIG. 5. In order to emphasize the continuity of the curves, curve C1" is shifted in the horizontal direction in FIG. 30. As shown in FIG. 30, curve C" does not increase continuously: it has four flat parts. In curve E5, however, the percentage of light varies substantially continuously in accordance with the change in the turning angle (there are no flat parts). Therefore, positioning the rotational axes the light blocking members 128L, 128R at the four corners of the second lens array 22 enables the quantity of light to be adjusted continuously even when concavities (serrations) are not formed in their leading edges of 128LB, 128RB.

Also, the percentage of light changes from 0% to 100% over about a 40° range of turning angles, enabling adjustment with more responsiveness than in comparative example C1 (FIG. 7). Therefore, in order to permit adjustment with high responsiveness, the rotational axes of the light blocking members are preferably positioned at opposing corners of the second lens array 22.

In FIG. 29, the blocking of the second images of the light source in FIG. 8 proceeds from peripheral columns, so bright and dark portions can be blocked simultaneously, which results in continuous change in the quantity of light in response to the turning angle. Since the angle between the maximum light blocking position and the minimum completely open position is smaller than in FIG. 2, a larger change in the quantity of light can be obtained for the same turning angle, improving the responsiveness.

From FIG. 29, to obtain continuous and highly responsive adjustment of the quantity of light, the length (dh3) of the short sides and the length (dv3) of the long sides of the light blocking members 128L, 128R preferably satisfy the following equations (5) and (6).

$$dh3 \geq \{(H1+H2+H3+H4+H5))^2+(V1+V2+V3)^2\}^{0.5} \quad (5)$$

$$dv3 \geq \{(2\times(H1+H2+H3+H4+H5))^2+(2\times(V1+V2+V3))^2\}^{0.5} \quad (6)$$

As explained above, according to embodiment 5, continuous adjustment of the quantity of light can be achieved even when the light blocking members 128L, 128R have no concavities on their leading edges. Since the rotational axes are positioned near the second lens array 22 in the z-axis direction and the light blocking members 128L, 128R turn in the xy-plane, embodiment 5 is free from line-like illuminance irregularities extending in the x-axis direction on the light valve.

A similar effect can be obtained when the rotational axes of the light blocking members 128L, 128R are shifted in the direction of a corner-to-corner diagonal line of the second lens array 22. In that case, however, the angle between the maximum light blocking position and the minimum completely open position of the light blocking members 128L, 128R is ninety degrees or less, and the lengths of the short sides and the long sides need to be considered.

FIG. 31 is a front view (seen in the z-axis direction) schematically illustrating the structure and operation of the rotational light blocking section in a variation of embodiment 5. Elements in FIG. 31 that are identical to or correspond to elements in FIG. 29 have the same reference characters. The light blocking members 128L, 128R and rotational axes 128LA, 128RA shown in FIG. 31 are positioned so that two straight lines oriented in the z-axis direction passing through two points in symmetric positions with respect to optical axis AX away from the two corners of the second lens array 22 in directions of increasing distance from the second lens array 22 coincide with the pair of rotational axes 128LA, 128RA. In other words, the example in FIG. 31 has a structure wherein rotational axis 128LA in FIG. 29 is shifted in the positive x-axis direction and rotational axis 128RA in FIG. 29 is shifted in the negative x-axis direction. The advantage of the structure in FIG. 31 is that, as shown in FIG. 29, the rotational axes 128LA, 128RA are not aligned with the second lens array 22. In other respects, the example in FIG. 31 is similar to the example in FIG. 29.

Regarding points other than the above, embodiment 5 is the same as embodiments 1 to 4.

FIGS. 6, 7, 17, 19, 27 and 30 all show the percentage of light for a 100% signal and show only the characteristic of the rotational light blocking section 91.

Embodiment 6

In the description of the above embodiments 1 and 2, the light blocking members and rotational axes were positioned so that when turned in the direction that increases the quantity of light blocked by the light blocking members, the turning range from the light blocking initiation position at which they start to block light in transit toward the second lens array 22 to the maximum light blocking position at which they block a maximum quantity of the light in transit toward the second lens array 22 was less than ninety degrees, and the light blocking members and rotational axes were positioned so that when the light blocking members were at the light blocking initiation position, at least part of each light blocking member was on the x-axis or the y-axis (this will be referred to as 'satisfying a first condition' below).

Non-preferred positions of the rotational axes in embodiment 2 above were described using FIGS. 19 and 20; placing the rotational axes in positions other than these non-preferred positions will be referred to as 'satisfying a second condition' below.

The exemplary projection display apparatus in embodiment 6 satisfies the second condition above. The projection display apparatus in embodiment 6 differs from embodiments 1 and 2 in that, besides cases satisfying the first condition, it includes cases in which the turning angle is greater than 90°, as shown in FIG. 18. In the projection display apparatus in embodiment 6, the light blocking members and rotational axes are positioned so that, as the light blocking members turn, when their edges are aligned in the x-axis direction, the position of their edges in the y-axis direction is a position other than the position in the y-axis direction of the joined edges of convex lenses that are adjacent in the y-axis direction in the second lens array 22. The projection display apparatus in embodiment 6 uses a mechanism that turns the light blocking members within the xy plane, but the turning angle from the light blocking initiation position to the maximum light blocking position may exceed 90°, so during the turning, the leading parts of the light blocking members may become parallel to the x-axis, but since they are not aligned with the positions of joined edges of adjacent convex lenses in the second lens array, the quantity of light received by the light valve can be made to vary continuously with respect to the turning angle of the light blocking members (so that there is no region in which the illuminance does not change even though the light blocking members are turning). Since the projection display apparatus in embodiment 6 can adjust the quantity of light received by the light valve continuously by the light quantity adjusting means, it can continuously display an image with an adequate sense of contrast.

The second condition is applicable even when the light blocking members are above and below the second lens array 22 (including the arrangement in FIG. 22). In this case, the light blocking members and the rotational axes are positioned so that as the light blocking members turn, when their edges are aligned in the y-axis direction, the position of their edges in the x-axis direction is a position other than the position in the x-axis direction of the joined edges of convex lenses that are adjacent in the x-axis direction in the second lens array 22.

Regarding points other than the above, embodiment 6 is the same as embodiments 1 to 4.

Embodiment 7

In the description of the above embodiments 1 and 2, the light blocking members and their rotational axes were positioned so that when the light blocking members are turned in the direction that increases the quantity of light blocked by the light blocking members, the angle made by the light blocking initiation position at which they start to block light in transit toward the second lens array 22 and the maximum light blocking position at which they block a maximum quantity of the light in transit toward the second lens array 22 was ninety degrees or less, and the light blocking members and their rotational axis were positioned so that when the light blocking members were at the light blocking initiation position, at least part of each light blocking member was on the x-axis or the y-axis (this will be referred to as 'satisfying a first condition' below).

Non-preferred positions of the rotational axes in embodiment 3 above were described using FIGS. 22 and 25; placing the rotational axes in positions other than these non-preferred positions will be referred to as 'satisfying a third condition' below.

The exemplary projection display apparatus in embodiment 7 satisfies the third condition above. The projection display apparatus in embodiment 7 differs from embodiments 1 to 3 in that, besides cases satisfying the first condition, it includes cases in which the turning angle is greater than 90°, as shown in FIG. 18. In the projection display apparatus in embodiment 7, a plurality of light-transmitting regions and a plurality of non-light-transmitting regions with their long sides aligned in the x-axis directions are arranged alternately in the y-axis direction on the surface of the polarization conversion element 3 facing the second lens array 22; light transmitted through the second lens array 22 and entering the light-transmitting regions is separated into first and second polarized light; the first polarized light is simply output, while the second polarized light is converted to first polarized light and output; the light blocking members and their rotational axes are positioned so that, when the light blocking members are turned so that their edges are aligned in the x-axis direction, their edges are positioned in the y-axis direction outside the ranges of the non-light-transmitting regions in the y-axis direction. The projection display apparatus in embodiment 7 uses a mechanism that turns the light blocking members in the xy plane, and the angle made by the light blocking initiation position and the maximum light blocking position may exceed 90°, so during the turning, the leading parts of the light blocking members may become parallel to the x-axis, but since they do not fall in the non-light-transmitting regions (the regions containing joined edges of adjacent convex lenses in the second lens array 22), the quantity of light received by the light valve 7 can be made to vary continuously with respect to the turning angle of the light blocking members (that is, there are no regions in which the illuminance does not change according to the turning of the light blocking members). Since the projection display apparatus in embodiment 7 can adjust the quantity of light received by the light valve 7 continuously by the light adjustment means, it can continuously display an image with an adequate sense of contrast.

The second condition is also applicable in the case in which the light blocking members are above and below the second lens array 22 (including the arrangement in FIG. 22). In this case, the light blocking members and their rotational axes are positioned so that, when the light blocking members are turned and their edges are aligned in the y-axis direction, their edges are disposed at positions in the x-axis direction other than the ranges of the non-light-transmitting regions in the x-axis direction.

Regarding points other than the above, embodiment 7 is the same as embodiments 1 to 3.

What is claimed is:

1. A projection display apparatus in an xyz coordinate system with a z-axis coincident with an optical axis, an x-axis orthogonal to the z-axis, and a y-axis orthogonal to the z-axis and the y-axis, the optical axis forming the origin of the xy plane, the projection display apparatus having:
    a light source section for emitting light;
    a first lens array with convex lenses the shape of which, on a first plane orthogonal to the z-axis, is rectangular with long sides in the x-axis direction and short sides in the y-axis direction, arranged in an array with a plurality of rows and a plurality of columns on the first plane, for uniformizing an illuminance distribution of the light emitted from the light source section;
    a second lens array with convex lenses the shape of which, on a second plane orthogonal to the z-axis, is rectangular with long sides in the x-axis direction and short sides in the y-axis direction, arranged in an array with a plurality of rows and a plurality of columns on the second plane, disposed in a position, spaced apart from the first lens array, such that the individual convex lenses of the first lens array face the individual convex lenses of the second lens array, for uniformizing the illuminance distribution of the light transmitted through the first lens array;
    a light valve for receiving the light transmitted through the second lens array and outputting light modulated according to an image signal;
    a projection optical system for projecting the light output from the light valve onto a screen; and
    a light quantity adjusting means disposed between the first lens array and the second lens array for adjusting a quantity of the light received by the light valve;
    wherein the light quantity adjusting means comprises
    one pair or a plurality of pairs of light blocking members for blocking light in transit from the first lens array to the second lens array,
    one pair or a plurality of pairs of rotational axes for turnably supporting each of the light blocking members on the xy plane,
    a turning mechanism for turning the light blocking members, and
    a turning control unit for controlling operations of the turning mechanism;
    wherein, of the one pair or the plurality of pairs of light blocking members, the light blocking members constituting each pair have xy coordinates that are symmetric with respect to the origin;
    wherein, of the one pair or the plurality of pairs of rotational axes, the rotational axes constituting each pair have xy coordinates that are symmetric with respect to the origin; and
    wherein the light blocking members and the rotational axes are positioned so that when the light blocking members are turned in a direction that increases the quantity of light blocked by the light blocking members, the turning range from a light blocking initiation position of the light blocking members at which the light blocking members, by being turned, start to block light in transit toward the second lens array to a maximum light blocking position of the light blocking members at which the light blocking members block a maximum quantity of the light in transit toward the second lens array is equal to or less than ninety degrees, and
    the light blocking members and the rotational axes are positioned so that when the light blocking members are at the light blocking initiation position, at least part of each light blocking member is on the x-axis or the y-axis.

2. The projection display apparatus of claim 1, wherein edges of the light blocking members that lead in the turning direction when the light blocking members are turned in a direction that increases the quantity of light blocked by the light blocking members have a straight shape.

3. The projection display apparatus of claim 2, wherein each of the light blocking members has a rectangular shape on the xy plane.

4. The projection display apparatus of claim 2, wherein the light blocking members forming the pair and the rotational axes forming the pair are configured so that when each of the light blocking members forming the pair is at the maximum light blocking position, the edges of the light blocking members that lead in the turning direction mutually abut, or the light blocking members forming the pair are disposed with an offset in the z-axis direction and the edges of the light blocking members forming the pair that lead in the turning direction overlie one another.

5. The projection display apparatus of claim 1, further comprising a signal detector that receives the image signal and calculates a relative quantity of light that increases with increasing average luminance of the image signal, wherein:
    the turning control unit increases the quantity of light blocked by the light blocking members as the calculated relative quantity of light decreases.

6. The projection display apparatus of claim 1, wherein the rotational light blocking section is disposed on the secondlens-array side of a position midway between the first lens array and the second lens array.

7. The projection display apparatus of claim 1, wherein:
the one pair or a plurality of pairs of light blocking members are one pair of light blocking members;
the one pair or a plurality of pairs of rotational axes are one pair of rotational axes; and
the light blocking members and the rotational axes are positioned so that two straight lines oriented in the z-axis direction passing through two points of intersection where the x-axis intersects the y-axis-direction perimeter of the second lens array on the second lens array coincide with the pair of the rotational axes and the turning range is ninety degrees.

8. The projection display apparatus of claim 1, wherein:
the one pair or a plurality of pairs of light blocking members are one pair of light blocking members;
the one pair or a plurality of pairs of rotational axes are one pair of rotational axes; and
the light blocking members and the rotational axes are positioned so that two straight lines oriented in the z-axis direction passing through two points on the x-axis exterior to two points of intersection where the x-axis intersects the y-axis-direction perimeter of the second lens array on the second lens array coincide with the pair of the rotational axes and the turning range is less than ninety degrees.

9. The projection display apparatus of claim 1, wherein:
the one pair or a plurality of pairs of light blocking members are one pair of light blocking members;
the one pair or a plurality of pairs of rotational axes are one pair of rotational axes;
the light blocking members and the rotational axes are positioned so that two straight lines oriented in the z-axis direction passing through two points of intersection where a straight line slanted with respect to the x-axis intersects the y-axis-direction perimeter of the second lens array on the second lens array coincide with the pair of the rotational axes and the turning range is less than ninety degrees; and
the slanted straight line makes an angle with respect to the x-axis smaller than an angle with respect to the x-axis made by a straight line joining the optical axis and a corner of the second lens array.

10. The projection display apparatus of claim 1, wherein:
the one pair or a plurality of pairs of light blocking members are one pair of light blocking members;
the one pair or a plurality of pairs of rotational axes are one pair of rotational axes;
the light blocking members and the rotational axes are positioned so that two straight lines oriented in the z-axis direction passing through two points exterior in the x-axis direction to two points of intersection where a straight line slanted with respect to the x-axis intersects the y-axis-direction perimeter of the second lens array on the second lens array coincide with the pair of the rotational axes and the turning range is less than ninety degrees; and
the slanted straight line makes an angle with respect to the x-axis smaller than an angle with respect to the x-axis made by a straight line joining the optical axis and a corner of the second lens array.

11. The projection display apparatus of claim 9, wherein:
edges of the light blocking members that lead in the turning direction when the light blocking members are turned in a direction that increases the quantity of light blocked by the light blocking members have a straight shape; and
the light blocking members and the rotational axes are positioned so that when the light blocking members turn so that said edges are aligned in the x-axis direction, the position in the y-axis direction of said edges differs from a position in the y-axis direction of joined edges of convex lenses of the second lens array that adjoin in the y-axis direction.

12. The projection display apparatus of claim 9, further comprising a polarization conversion element disposed facing the second lens array, having a plurality of light-transmitting regions with long dimensions oriented in the x-axis direction and a plurality of non-light-transmitting regions with long dimensions oriented in the x-axis direction disposed alternately in the y-axis direction in a surface on the second-lens-array side, for separating light that passes through the second lens array and is received by the light-transmitting regions into first polarized light and second polarized light, outputting the separated first polarized light, converting the separated second polarized light into the first polarized light, and outputting the converted light, wherein:
edges of the light blocking members that lead in the turning direction when the light blocking members are turned in a direction that increases the quantity of light blocked by the light blocking members have a straight shape; and
the light blocking members and the rotational axes are positioned so that when the light blocking members turn so that said edges are aligned in the x-axis direction, the position in the y-axis direction of said edges differs from positions in the y-axis direction in which the non-light-transmitting regions are present.

13. The projection display apparatus of claim 1, wherein:
the one pair or a plurality of pairs of light blocking members are one pair of light blocking members;
the one pair or a plurality of pairs of rotational axes are one pair of rotational axes; and
the light blocking members and the rotational axes are positioned so that two straight lines oriented in the z-axis direction passing through two points of intersection where the x-axis intersects the y-axis-direction perimeter of the second lens array on the second lens array coincide with the pair of the rotational axes and the turning range is ninety degrees.

14. The projection display apparatus of claim 1, wherein:
the one pair or a plurality of pairs of light blocking members are one pair of light blocking members;
the one pair or a plurality of pairs of rotational axes are one pair of rotational axes; and
the light blocking members and the rotational axes are positioned so that two straight lines oriented in the z-axis direction passing through two points on the y-axis exterior to two points of intersection where the y-axis intersects the x-axis-direction perimeter of the second lens array on the second lens array coincide with the pair of the rotational axes and the turning range is less than ninety degrees.

15. The projection display apparatus of claim 1, wherein:
the one pair or a plurality of pairs of light blocking members are one pair of light blocking members;
the one pair or a plurality of pairs of rotational axes are one pair of rotational axes;
the light blocking members and the rotational axes are positioned so that two straight lines oriented in the z-axis direction passing through two points of intersection where a straight line slanted with respect to the y-axis intersects the x-axis-direction perimeter of the second lens array on the second lens array coincide with the pair of the rotational axes and the turning range is less than ninety degrees; and the slanted straight line makes an angle with respect to the y-axis smaller than an angle with respect to the y-axis made by a straight line joining the optical axis and a corner of the second lens array.

16. The projection display apparatus of claim 1, wherein:
the one pair or a plurality of pairs of light blocking members are one pair of light blocking members;
the one pair or a plurality of pairs of rotational axes are one pair of rotational axes;
the light blocking members and the rotational axes are positioned so that two straight lines oriented in the z-axis direction passing through two points exterior in the y-axis direction to two points of intersection where a straight line slanted with respect to the y-axis intersects the x-axis-direction perimeter, of the second lens array on the second lens array coincide with the pair of the rotational axes and the turning range is less than ninety degrees; and
the slanted straight line makes an angle with respect to the y-axis smaller than an angle with respect to the y-axis made by a straight line joining the optical axis and a corner of the second lens array.

17. The projection display apparatus of claim 15, wherein:
edges of the light blocking members that lead in the turning direction when the light blocking members are turned in a direction that increases the quantity of light blocked by the light blocking members have a straight shape; and
the light blocking members and the rotational axes are positioned so that when the light blocking members turn so that said edges are aligned in the y-axis direction, the position in the x-axis direction of said edges differs from a position in the x-axis direction of joined edges of convex lenses of the second lens array that adjoin in the x-axis direction.

18. The projection display apparatus of claim 15, further comprising a polarization conversion element disposed facing the second lens array, having a plurality of light-transmitting regions with long dimensions oriented in the y-axis direction and a plurality of non-light-transmitting regions with long dimensions oriented in the y-axis direction disposed alternately in the x-axis direction in a surface on the second-lens-array side, for separating light that passes through the second lens array and is received by the light-transmitting regions into first polarized light and second polarized light, outputting the separated first polarized light, converting the separated second polarized light into the first polarized light, and outputting the converted light, wherein:
edges of the light blocking members that lead in the turning direction when the light blocking members are turned in a direction that increases the quantity of light blocked by the light blocking members have a straight shape; and
the light blocking members and the rotational axes are positioned so that when the light blocking members turn so that said edges are aligned in the y-axis direction, the position in the x-axis direction of said edges differs from positions in the x-axis direction in which the non-light-transmitting regions are present.

19. The projection display apparatus of claim 1, wherein:
the one pair or a plurality of pairs of light blocking members are two pairs of light blocking members;
the one pair or a plurality of pairs of rotational axes are two pairs of rotational axes;
one pair of the light blocking members in the two pairs of the light blocking members and one pair of the rotational axes in the two pairs of the light blocking members are positioned so that two straight lines oriented in the z-axis direction passing through two points of intersection where the x-axis intersects the y-axis-direction perimeter of the second lens array on the second lens array coincide with the one pair of the rotational axes and the turning range of the one pair of the light blocking members is ninety degrees; and
another pair of the light blocking members in the two pairs of the light blocking members and another pair of the rotational axes in the two pairs of the light blocking members are positioned so that two straight lines oriented in the z-axis direction passing through two points of intersection where the y-axis intersects the x-axis-direction perimeter of the second lens array on the second lens array coincide with the another pair of the rotational axes and the turning range of the one pair of the light blocking members is ninety degrees.

20. The projection display apparatus of claim 1, wherein:
the one pair or a plurality of pairs of light blocking members are two pairs of light blocking members;
the one pair or a plurality of pairs of rotational axes are two pairs of rotational axes;
one pair of the light blocking members in the two pairs of the light blocking members and one pair of the rotational axes in the two pairs of the rotational axes are positioned so that two straight lines oriented in the z-axis direction passing through two points of intersection where a straight line slanted with respect to the x-axis intersects the y-axis-direction perimeter of the second lens array on the second lens array coincide with the one pair of the rotational axes and the turning range of the one pair of the light blocking members is less than ninety degrees; and
another pair of the light blocking members in the two pairs of the light blocking members and another pair of the rotational axes in the two pairs of the rotational axes are positioned so that two straight lines oriented in the z-axis direction passing through two points of intersection where a straight line slanted with respect to the y-axis intersects the x-axis-direction perimeter of the second lens array on the second lens array coincide with the another pair of the rotational axes and the turning range of the another pair of the light blocking members is less than ninety degrees.

21. The projection display apparatus of claim 19, wherein:
edges of the light blocking members that lead in the turning direction when the light blocking members are turned in a direction that increases the quantity of light blocked by the light blocking members have a straight shape;
the one pair of the light blocking members in the two pairs of the light blocking members and the one pair of the rotational axes in the two pairs of the rotational axes are positioned so that when the light blocking members turn so that said edges are aligned in the x-axis direction, the position in the y-axis direction of said edges differs from a position in the y-axis direction of joined edges of convex lenses of the second lens array that adjoin in the y-axis direction; and
the another pair of the light blocking members in the two pairs of the light blocking members and the another pair of the rotational axes in the two pairs of the rotational axes are positioned so that when the light blocking members turn so that said edges are aligned in the y-axis direction, the position in the x-axis direction of said edges differs from a position in the x-axis direction of joined edges of convex lenses of the second lens array that adjoin in the x-axis direction.

22. The projection display apparatus of claim 1, wherein:
the one pair or a plurality of pairs of light blocking members are one pair of light blocking members;
the one pair or a plurality of pairs of rotational axes are one pair of rotational axes; and
the light blocking members and the rotational axes are positioned so that two straight lines oriented in the z-axis direction passing through two corners of the second lens array in positions symmetrical with respect to the optical axis coincide with the one pair of the rotational axes.

23. The projection display apparatus of claim 1, wherein:
the one pair or a plurality of pairs of light blocking members are one pair of light blocking members;
the one pair or a plurality of pairs of rotational axes are one pair of rotational axes; and
the light blocking members and the rotational axes are positioned so that two straight lines oriented in the z-axis direction passing through two positions spaced away from two corners of the second lens array in positions symmetrical with respect to the optical axis, in a direction that moves the light blocking members and the rotational axes away from the second lens array, coincide with the one pair of the rotational axes.

24. A projection display apparatus in an xyz coordinate system with a z-axis coincident with an optical axis, an x-axis orthogonal to the z-axis, and a y-axis orthogonal to the z-axis and the y-axis, the optical axis forming the origin of the xy plane, the projection display apparatus having:
a light source section for emitting light;
a first lens array with convex lenses the shape of which, on a first plane orthogonal to the z-axis, is rectangular with long sides in the x-axis direction and short sides in the y-axis direction, arranged in an array with a plurality of rows and a plurality of columns on the first plane, for uniformizing an illuminance distribution of the light emitted from the light source section;
a second lens array with convex lenses the shape of which, on a second plane orthogonal to the z-axis, is rectangular with long sides in the x-axis direction and short sides in the y-axis direction, arranged in an array with a plurality of rows and a plurality of columns on the second plane, disposed in a position, spaced apart from the first lens array, such that the individual convex lenses of the first lens array face the individual convex lenses of the second lens array, for uniformizing the illuminance distribution of the light transmitted through the first lens array;
a light valve for receiving the light transmitted through the second lens array and outputting light modulated according to an image signal;
a projection optical system for projecting the light output from the light valve onto a screen; and
a light quantity adjusting means disposed between the first lens array and the second lens array for adjusting a quantity of the light received by the light valve;
wherein the light quantity adjusting means comprises
one pair or a plurality of pairs of light blocking members for blocking light in transit from the first lens array to the second lens array,
one pair or a plurality of pairs of rotational axes for turnably supporting each of the light blocking members on the xy plane,
a turning mechanism for turning the light blocking members, and
a turning control unit for controlling operations of the turning mechanism;
wherein, of the one pair or the plurality of pairs of light blocking members, the light blocking members constituting each pair have xy coordinates that are symmetric with respect to the origin;
wherein, of the one pair or the plurality of pairs of rotational axes, the rotational axes constituting each pair have xy coordinates that are symmetric with respect to the origin;
wherein edges of the light blocking members that lead in the turning direction when the light blocking members are turned in a direction that increases the quantity of light blocked by the light blocking members have a straight shape; and
wherein the light blocking members and the rotational axes are positioned so that when the light blocking members turn so that said edges are aligned in the x-axis direction, the position in the y-axis direction of said edges differs from a position in the y-axis direction of joined edges of convex lenses of the second lens array that adjoin in the y-axis direction.

25. A projection display apparatus in an xyz coordinate system with a z-axis coincident with an optical axis, an x-axis orthogonal to the z-axis, and a y-axis orthogonal to the z-axis and the y-axis, the optical axis forming the origin of the xy plane, the projection display apparatus having:
a light source section for emitting light;
a first lens array with convex lenses the shape of which, on a first plane orthogonal to the z-axis, is rectangular with long sides in the x-axis direction and short sides in the y-axis direction, arranged in an array with a plurality of rows and a plurality of columns on the first plane, for uniformizing an illuminance distribution of the light emitted from the light source section;
a second lens array with convex lenses the shape of which, on a second plane orthogonal to the z-axis, is rectangular with long sides in the x-axis direction and short sides in the y-axis direction, arranged in an array with a plurality of rows and a plurality of columns on the second plane, disposed in a position, spaced apart from the first lens array, such that the individual convex lenses of the first lens array face the individual convex lenses of the second lens array, for uniformizing the illuminance distribution of the light transmitted through the first lens array;
a light valve for receiving the light transmitted through the second lens array and outputting light modulated according to an image signal;
a projection optical system for projecting the light output from the light valve onto a screen; and
a light quantity adjusting means disposed between the first lens array and the second lens array for adjusting a quantity of the light received by the light valve;
wherein the light quantity adjusting means comprises
one pair or a plurality of pairs of light blocking members for blocking light in transit from the first lens array to the second lens array,
one pair or a plurality of pairs of rotational axes for turnably supporting each of the light blocking members on the xy plane,
a turning mechanism for turning the light blocking members, and
a turning control unit for controlling operations of the turning mechanism;

wherein, of the one pair or the plurality of pairs of light blocking members, the light blocking members constituting each pair have xy coordinates that are symmetric with respect to the origin;

wherein, of the one pair or the plurality of pairs of rotational axes, the rotational axes constituting each pair have xy coordinates that are symmetric with respect to the origin;

wherein edges of the light blocking members that lead in the turning direction when the light blocking members are turned in a direction that increases the quantity of light blocked by the light blocking members have a straight shape; and wherein the light blocking members and the rotational axes are positioned so that when the light blocking members turn so that said edges are aligned in the y-axis direction, the position in the x-axis direction of said edges differs from a position in the x-axis direction of joined edges of convex lenses of the second lens array that adjoin in the y-axis direction.

26. A projection display apparatus in an xyz coordinate system with a z-axis coincident with an optical axis, an x-axis orthogonal to the z-axis, and a y-axis orthogonal to the z-axis and the y-axis, the optical axis forming the origin of the xy plane, the projection display apparatus having:

a light source section for emitting light;

a first lens array with convex lenses the shape of which, on a first plane orthogonal to the z-axis, is rectangular with long sides in the x-axis direction and short sides in the y-axis direction, arranged in an array with a plurality of rows and a plurality of columns on the first plane, for uniformizing an illuminance distribution of the light emitted from the light source section;

a second lens array with convex lenses the shape of which, on a second plane orthogonal to the z-axis, is rectangular with long sides in the x-axis direction and short sides in the y-axis direction, arranged in an array with a plurality of rows and a plurality of columns on the second plane, disposed in a position, spaced apart from the first lens array, such that the individual convex lenses of the first lens array face the individual convex lenses of the second lens array, for uniformizing the illuminance distribution of the light transmitted through the first lens array;

a polarization conversion element disposed facing the second lens array;

a light valve for receiving the light transmitted through the polarization conversion element and outputting light modulated according to an image signal;

a projection optical system for projecting the light output from the light valve onto a screen; and a light quantity adjusting means disposed between the first lens array and the second lens array for adjusting a quantity of the light received by the light valve;

wherein the light quantity adjusting means comprises one pair or a plurality of pairs of light blocking members for blocking light in transit from the first lens array to the second lens array, one pair or a plurality of pairs of rotational axes for turnably supporting each of the light blocking members on the xy plane, a turning mechanism for turning the light blocking members, and a turning control unit for controlling operations of the turning mechanism;

wherein, of the one pair or the plurality of pairs of light blocking members, the light blocking members constituting each pair have xy coordinates that are symmetric with respect to the origin;

wherein, of the one pair or the plurality of pairs of rotational axes, the rotational axes constituting each pair have xy coordinates that are symmetric with respect to the origin;

wherein edges of the light blocking members that lead in the turning direction when the light blocking members are turned in a direction that increases the quantity of light blocked by the light blocking members have a straight shape;

wherein the polarization conversion element has a plurality of light-transmitting regions with long dimensions oriented in the x-axis direction and a plurality of non-light-transmitting regions with long dimensions oriented in the x-axis direction disposed alternately in the y-axis direction in a surface on the second-lens-array side, for separating light that passes through the second lens array and is received by the light-transmitting regions into first polarized light and second polarized light, outputting the separated first polarized light, converting the separated second polarized light into the first polarized light, and outputting the converted light; and the light blocking members and the rotational axes are positioned so that when the light blocking members turn so that said edges are aligned in the x-axis direction, the position in the y-axis direction of said edges differs from positions in the y-axis direction in which the non-light-transmitting regions are present.

27. A projection display apparatus in an xyz coordinate system with a z-axis coincident with an optical axis, an x-axis orthogonal to the z-axis, and a y-axis orthogonal to the z-axis and the y-axis, the optical axis forming the origin of the xy plane, the projection display apparatus having:

a light source section for emitting light;

a first lens array with convex lenses the shape of which, on a first plane orthogonal to the z-axis, is rectangular with long sides in the x-axis direction and short sides in the y-axis direction, arranged in an array with a plurality of rows and a plurality of columns on the first plane, for uniformizing an illuminance distribution of the light emitted from the light source section;

a second lens array with convex lenses the shape of which, on a second plane orthogonal to the z-axis, is rectangular with long sides in the x-axis direction and short sides in the y-axis direction, arranged in an array with a plurality of rows and a plurality of columns on the second plane, disposed in a position, spaced apart from the first lens array, such that the individual convex lenses of the first lens array face the individual convex lenses of the second lens array, for uniformizing the illuminance distribution of the light transmitted through the first lens array;

a polarization conversion element disposed facing the second lens array;

a light valve for receiving the light transmitted through the polarization conversion element and outputting light modulated according to an image signal;

a projection optical system for projecting the light output from the light valve onto a screen; and a light quantity adjusting means disposed between the first lens array and the second lens array for adjusting a quantity of the light received by the light valve;

wherein the light quantity adjusting means comprises
one pair or a plurality of pairs of light blocking members for blocking light in transit from the first lens array to the second lens array,
one pair or a plurality of pairs of rotational axes for turnably supporting each of the light blocking members on the xy plane,
a turning mechanism for turning the light blocking members, and
a turning control unit for controlling operations of the turning mechanism;
wherein, of the one pair or the plurality of pairs of light blocking members, the light blocking members constituting each pair have xy coordinates that are symmetric with respect to the origin;
wherein, of the one pair or the plurality of pairs of rotational axes, the rotational axes constituting each pair have xy coordinates that are symmetric with respect to the origin;
wherein edges of the light blocking members that lead in the turning direction when the light blocking members are turned in a direction that increases the quantity of light blocked by the light blocking members have a straight shape;
wherein the polarization conversion element has a plurality of light-transmitting regions with long dimensions oriented in the x-axis direction and a plurality of non-light-transmitting regions with long dimensions oriented in the y-axis direction disposed alternately in the x-axis direction in a surface on the second-lens-array side, for separating light that passes through the second lens array and is received by the light-transmitting regions into first polarized light and second polarized light, outputting the separated first polarized light, converting the separated second polarized light into the first polarized light, and outputting the converted light; and
wherein the light blocking members and the rotational axes are positioned so that when the light blocking members turn so that said edges are aligned in the x-axis direction, the position in the x-axis direction of said edges differs from positions in the x-axis direction in which the non-light-transmitting regions are present.

* * * * *